United States Patent
Damaraju et al.

(10) Patent No.: US 9,911,211 B1
(45) Date of Patent: Mar. 6, 2018

(54) LENS-BASED USER-INTERFACE FOR VISUALIZATIONS OF GRAPHS

(71) Applicant: Quid, Inc., San Francisco, CA (US)

(72) Inventors: Sashikanth Damaraju, San Francisco, CA (US); Grant Titus, San Francisco, CA (US)

(73) Assignee: Quid, Inc., San Francisco, CA (US)

( * ) Notice: Subject to any disclaimer, the term of this patent is extended or adjusted under 35 U.S.C. 154(b) by 0 days.

(21) Appl. No.: 15/486,565

(22) Filed: Apr. 13, 2017

(51) Int. Cl.
  *G06T 11/20* (2006.01)
  *G06F 3/01* (2006.01)
  *G06F 3/16* (2006.01)
  *G06F 3/0488* (2013.01)

(52) U.S. Cl.
  CPC ............ *G06T 11/206* (2013.01); *G06F 3/013* (2013.01); *G06F 3/0488* (2013.01); *G06F 3/167* (2013.01); *G06F 2203/04805* (2013.01); *G06F 2203/04806* (2013.01)

(58) Field of Classification Search
  CPC ........ G06T 11/206; G06F 3/013; G06F 3/167; G06F 3/0488; G06F 2203/04806; G06F 2203/04805
  See application file for complete search history.

(56) References Cited

U.S. PATENT DOCUMENTS

| | | | |
|---|---|---|---|
| 6,778,995 B1 * | 8/2004 | Gallivan | G06F 17/3071 707/739 |
| 2004/0039496 A1 * | 2/2004 | Dautelle | G06F 3/0481 701/3 |
| 2006/0026521 A1 * | 2/2006 | Hotelling | G06F 3/0418 715/702 |
| 2010/0053116 A1 * | 3/2010 | Daverman | G06F 3/0414 345/175 |
| 2010/0106752 A1 | 4/2010 | Eckardt, III et al. | |
| 2010/0223276 A1 | 9/2010 | Al-Shameri et al. | |
| 2011/0257893 A1 | 10/2011 | Taylor et al. | |
| 2016/0004779 A1 | 1/2016 | Sathish et al. | |
| 2016/0110447 A1 | 4/2016 | Eckardt et al. | |
| 2016/0110496 A1 | 4/2016 | Taylor et al. | |

OTHER PUBLICATIONS

Bier et al. , Toolglass and Magic Lenses: The See-Through Interface, Proceeding SIGGRAPH '93 Proceedings of the 20th annual conference on Computer graphics and interactive techniques, 73-80.*
'Supporting Interactive Graph Analysis Using Adjustable Magic Lenses', ITS 2015, Nov. 15-18, 2015, pp. 1 to 6.
'Fisheye Tree Views and Lenses for Graph Visualization', Tenth International Conference on Information Visualisation (IV'06) , Jul. 5-7, 2006, pp. 1 to 8.
'Quid', https://web.archive.org/web/20170323120934/https://quid.com/, Mar. 23, 2017, pp. 1 to 8.

* cited by examiner

*Primary Examiner* — Robert Craddock
(74) *Attorney, Agent, or Firm* — Pillsbury Winthrop Shaw Pittman LLP

(57) ABSTRACT

Provided is a process of adjusting a visualization of a graph in response to user interactions with the visualization, the process including: obtaining a graph; causing a visualization of the graph to be presented on one or more displays having a display area; receiving a request for a lens be applied to the visualization; selecting a first portion of the graph based on the first portion being presented within the region specified by the lens; and transforming the first portion of the graph.

28 Claims, 11 Drawing Sheets

LENS-BASED USER-INTERFACE FOR VISUALIZATIONS OF GRAPHS

BACKGROUND

1. Field

The present disclosure relates generally to graph analysis and, more specifically, to user interfaces to manipulate visual representations of graphs.

2. Description of the Related Art

Graphs are powerful data models for understanding systems in which relationships between entities are important. Examples include graphs characterizing relationships between documents, like semantic similarity between each document in a corpus, such as news articles published in a given decade, or between websites, or between scientific journal articles. Other examples include graphs characterizing relationships between other entities, like between companies, countries, or people, such as graphs relating exchanges there between or similarities there between.

SUMMARY

The following is a non-exhaustive listing of some aspects of the present techniques. These and other aspects are described in the following disclosure.

Some aspects include a process of adjusting a visualization of a graph in response to user interactions with the visualization, the process including: obtaining a graph, the graph having a plurality of nodes and edges connecting the nodes; causing a visualization of the graph to be presented on one or more displays having a display area in which the visualization is presented; after causing the visualization of the graph to be presented, receiving a first user input requesting that a first lens be applied to the visualization, wherein: the first lens defines a first region of the display area that, at least initially, occupies a subset of the display area; the first lens specifies a first transformation that affects the visualization differently in the first region than outside the first region of the display area; selecting a first portion of the graph based on the first portion being presented within the first region in the visualization; transforming the first portion of the graph with the first transformation specified by the first lens; and causing the visualization of the graph to be updated to present in the display area both the transformed first portion and other portions of the graph outside the first region to which the first transformation is not applied.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
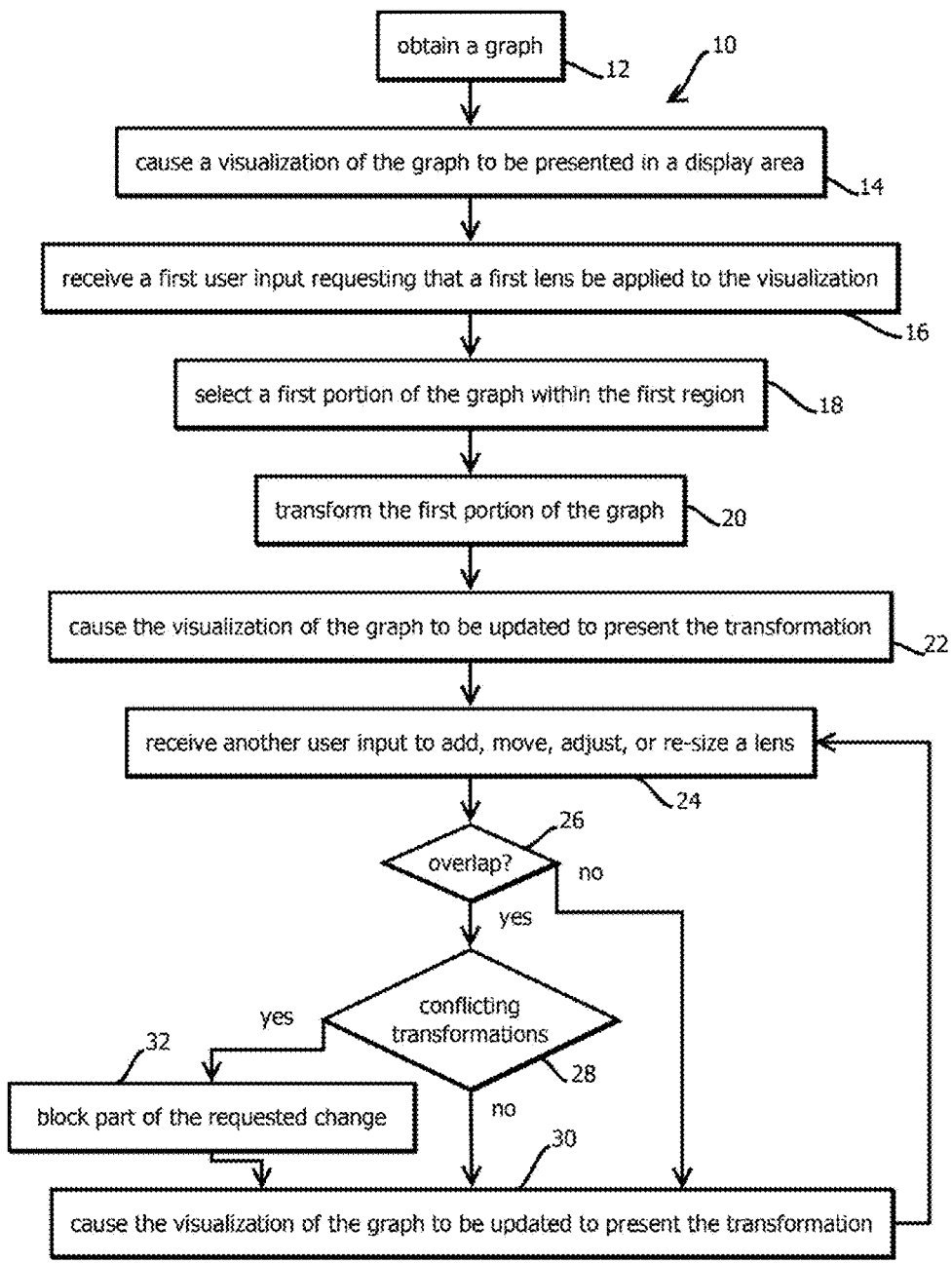
FIG. 1 illustrates an example of a process by which a user may manipulate a visual representation of a graph in accordance with some embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of computer science and human-computer interaction. Indeed, the inventors wish to emphasize the difficulty of recognizing those problems that are nascent and will become much more apparent in the future should trends in industry continue as the inventors expect, particularly as richer user interaction mechanisms are developed, like room-scale virtual reality, augmented reality displays, and three-dimensional position sensors. Further, because multiple problems are addressed, it should be understood that some embodiments are problem-specific, and not all embodiments address every problem with traditional systems described herein or provide every benefit described herein. That said, improvements that solve various permutations of these problems are described below.

Visualizations of graphs are often a powerful way to understand large collections of data. Often, important insights lie in the relationship between various entities described in collections of data, attributes of those entities, and attributes of those relationships. Graph visualizations provide views into this data from which users can extract insights. In many cases, however, those views are limited relative to the dimensionality of the data. A given data set often could be viewed in thousands of different ways, with different views providing different insights. In many cases, is difficult for a user to configure a visualization to present a desired view, and in many use cases, a user may wish to iteratively adjust the visualization based on what they have learned in an existing visualization to interrogate the underlying data. Further, in many cases, the different visualizations are computationally expensive to calculate, particularly for large data sets, and these calculations can introduce latency between when a user requests a given visualization and when that visualization is presented to the user. This latency combined with the cognitive load of configuring visualizations often creates friction impedes efforts to extract insights from data sets with many traditional computer systems.

FIG. 1 is a flow chart showing an example of a process 10 that may mitigate some of the above-described issues with traditional data visualization computer systems. In some embodiments, the process 10 may power a user interface by which a user may relatively quickly apply different views to a data set in a visualization. In some embodiments, the user interface is a touch user interface in which a user selects subsets of a visualization to receive different transformations, thereby revealing different views into the data in the selected subsets. Some embodiments may facilitate user selection of those subsets with a lens described below with which a user selects regions of a visualization and transformations to apply on data within those regions in the visualization. In some cases, these lenses may be combined, moved, resized, and the like to facilitate relatively rapid interaction with the data. Further, in some cases, these lenses may have transformations that are pre-calculated to reduce latency in when updating visualizations to reflect changes in lenses being applied. (Though, again, not all embodiments provide all listed benefits, as various designs are contemplated with tradeoffs between ease of implementation and responsiveness.)

In some embodiments, the process 10 may provide these features and others for visualizations and interfaces like those described below with reference to FIGS. 2 through 9. In some cases, the process 10 may be executed by or in cooperation with a computational linguistics system described below with reference to FIG. 10, and in some cases, components of that system may be implemented with one or more computer systems described below with reference to FIG. 11. In some embodiments, instructions in program code that when executed by one or more processors give effect to the process 10 or the other processes and functionality described herein may be stored on a tangible, non-transitory, machine-readable medium, which in some cases, may be distributed among a plurality of different computer systems, with each computer system storing a different subset of the instructions executed by the computer system (a scenario still within the scope of the term "medium," singular).

In some embodiments, the process 10 begins with obtaining a graph, as indicated by Block 12. In some embodiments, the graph may have a plurality of nodes and edges. In some embodiments, those edges may extend between pairs of nodes, with each edge connecting two and only two nodes in some embodiments. In some cases, the edges are directed edges, and in some cases, the edges are weighted with values indicating attributes of relationships between the corresponding nodes. In some embodiments, the nodes are associated with attributes of the nodes, which are different from identifiers of the nodes. In some cases, nodes may be clustered, and in some cases, clusters may be visualized with links between icons representing the clusters. In some embodiments, attributes of nodes, clusters, edges, links between clusters, and various other graph visualization elements may be nominal, ordinal, or cardinal values.

In some embodiments, the graph is relatively large, for example, having more than 5,000 nodes and more than 10,000 connections reflected in more than 10,000 edges. Some embodiments may display subsets, all, or aggregations of these nodes and edges. In some embodiments, the graph is a similarity graph, such as a semantic similarity graph formed with the techniques described below with reference to FIG. 10. In other cases, the graph may be obtained fully formed, for instance, a social network, an interest graph, a communication graph of communications between parties, a transaction graph of transactions between parties, and the like.

Next, some embodiments may cause a visualization of the graph to be presented in a display area, as indicated by Block 14. In some embodiments, the visualization is one of those described below with reference to FIGS. 2 through 9. Causing a visualization of the graph to be presented may include sending data and instructions to a client computing device from a server, and that data and instructions, when received may result in the client computing device presenting the visualization. Thus, causing a visualization of a graph to be presented does not necessarily require that the computer system causing the visualization to be presented actually present the visualization itself. In other cases, causing a visualization of the graph to be presented may be performed by the same computer system that presents the visualization.

In some embodiments, the visualization is presented in a display area on one or more displays. For example, the visualization may be presented on a touchscreen display, for example, on a tablet computer, a laptop, a smart phone, a wall-mounted display, and the like. In some embodiments, the visualization may be presented on a head-mounted display, for example, on an augmented reality or virtual-reality head-mounted display. In these scenarios, in some cases, different perspectives of the visualization may be presented on different displays or portions of a display arranged to present those different perspectives to different eyes of the viewer to provide a stereoscopic view in three dimensions. In some embodiments, the head-mounted display may include an inertial tracking unit (or external room-scale position sensor, like with an array of cameras or time-of-flight sensors configured to track the position of the headset or hand-held user input devices), and some embodiments may adjust the display responsive to signals from the inertial tracking unit such that the visualization appears to be in a static location from the perspective of the user as the user moves their head in views the visualization from different perspectives.

Some embodiments may include receiving a first user input requesting that a first lens be applied to the visualization, as indicated by Block 16. Inputs may be received with a variety of techniques. For example, in some cases, inputs may be received on a touchscreen of a touchscreen display. In some cases, the input may yield an on-touch event having a location on the screen where the user touched. In some cases, the touchscreen may be forced-sensitive, and the location may be associated with a value indicating a force with which the user touched the screen, for instance, ranging from 0 to 31. In some embodiments, the input may be a touch and drag input to a touchscreen, having a touch start location and a touch release location, the latter being associated with a touch-release event having the second location. In some embodiments, the input may be a multi-touch input to a touchscreen having on-touch and touch-release events associated with each of several of the user's fingers, for example. Some embodiments may receive these corresponding events and executed a gesture classifier to classify the user's input as indicating various commands. In some embodiments, the user input is a touch in a region of the display area having a menu of lenses and, in some cases, configuration options for the lenses. In some embodiments, the lens may be created responsive to the user selection within this menu and selection among configuration options.

The term "lens" is used to refer to a region of a display in which a transformation is applied to a visualization of a graph. In some cases, the lens is a subset of the display, for example, a circle, rectangle, slidable rectangle, lassoed area, convex hull, or the like. In some cases, the lens may be positioned and resized by the user based on user interactions. The transformations applied by a lens may be applied within a region of the display within a parameter of the lens.

The transformations may take a variety of different forms, examples of which are described below. In some embodiments, the transformations are transformations to the graph. For example, in some embodiments, the transformations change parameters of algorithms by which the graph is formed. Examples include up-weighting or down-weighting scores associated with various n-grams in the feature vectors (like at an intersection in an adjacency matrix) described below with reference to FIG. 10, for example, responsive to those n-grams being within a user-supply list, being determined to be related to (e.g. synonyms of) terms within a user supplied list, those n-grams being determined to be related to a topic, such as a topic identified with an unsupervised machine learning analysis of a corpus of text, and the like. Another example of a transformation applying to a graph itself includes changing thresholds by which an adjacency matrix is pruned. Examples of the adjacency matrix and pruning in the context of natural language processing are described below with reference to FIG. 10. But the same techniques may be applied in other domains.

In some embodiments, the transformation surfaces additional information about components of a graph, without changing the graph itself. For example, nodes, edges, clusters, and links between clusters may have various forms of metadata, and some embodiments may change the way these elements are depicted in a visualization based on the value of the metadata field selected in a transformation. For example, some embodiments may change the color of node icons corresponding to documents based on metadata indicating an amount of times that the respective documents were shared between users or cited by one another. For instance, color in the range of red to blue may be mapped to corresponding amounts of sharing. In another example, nodes or clusters may represent companies, and shapes of icons corresponding to the nodes or clusters may be changed based on market share of the companies. A variety of different visual attributes may be changed including sizes of icons, colors of icons, orientation of icons, transparency of icons, drop shadows of icons, positions of icons, frequency or amplitude of vibratory movement of icons, and the like.

In some embodiments, the transformation is based on metrics of the graph itself, for example, inter-cluster fraction scores of nodes, betweenness centrality of nodes, numbers of edges of nodes, and the like. In another example, the transformation indicates topic scores indicating amounts of correspondence between various topics and nodes, such as the topic scores described below with reference to FIG. 10.

In some embodiments, the transformation relates to changes to physical parameters in a physics model by which the graph visualization is generated, for example, in a force directed graph. For example, a transformation may change a repelling force in such a model, for example, increasing the repelling force to make nodes separate and be easier to be seen, or decreasing the repelling force to make node groupings easier to see. In some cases, these forces may be a function of distance between the corresponding nodes, and examples are described below with reference to FIG. 10. Other examples include changing an inertia or dampening factor that affects how the graph responds to movement, such as a user dragging one icon.

In some embodiments, the transformation is to parameters by which nodes are clustered. For example, some embodiments may adjust threshold by which nodes are determined to be in the same cluster or out of a cluster. In some embodiments, a lens applying such a transformation may be used to break up clusters and view the result of a finer granularity clustering, or to consolidate clusters to simplify a view. Examples of such clustering algorithms and their corresponding parameters are described below.

In some embodiments, the transformation may be applied uniformly with in an area specified by a lens, or some embodiments may adjust amounts of the transformation in different portions of that area. For example, some embodiments may apply a fisheye transformation by which transformations near a perimeter of the area specified by a lens are decreased in amount to smooth a transition visually from inside the lens to outside the lens. For example, some embodiments may determine a distance between a given element of a graph depicted in a visualization and the perimeter of a lens and calculate a score based on that distance. In some cases, the score may decrease proportionally or non-proportionally relative to distance to the perimeter. In some embodiments, the score may decrease monotonically as the distance decreases within the lens, and no transformations may be performed outside the perimeter of the lens.

Next, some embodiments may select a first portion of the graph with the first region specified by a lens, as indicated by Block 18. The region specified by a lens may be the area within a perimeter of the lens in the visualization. The selected portion of the graph may be those elements of the graph, e.g. nodes, edges, clusters, or links between clusters, that are displayed in the visualization in the area within the perimeter of the lens. In some cases, elements of the graph may span the perimeter, and a variety of different techniques may be used to determine whether those elements are inside or outside the area specified by a lens. For example, some embodiments may determine whether more than half of the element is within the lens area, or some embodiments may determine whether all of the element is within the lens area or any portion of the element is within the lens area, depending upon the implementation.

In some use cases, the size of the lens and position of the lens may be such that only a portion of the graph is selected and other portions of the graph are not selected because those other portions are depicted outside the area correspond to the lens in the visualization. Thus, selecting the first portion may include selecting a subset of the elements of the graph and not selecting a different subset of the elements of the graph. Depending upon the shape of the area of the lens, different techniques may be used to determine whether a given element of a graph is within the area. For example, where the lens is a circle, some embodiments may calculate a Euclidean distance in the display space between a center of the area of the lens and the location of the graph element in the visualization. Some embodiments may determine those graph elements having less than a threshold Euclidean distance to be within the first portion. In another example, for instance where a lasso is used, various point-in polygon algorithms may be executed in order to determine whether a given graph element is within the area of the lens. For example, the user may freehand draw a region of the display screen by dragging their finger in a closed shape to define a perimeter, and some embodiments may decompose that shape into an approximating polygon having vertices and display space. Some embodiments may then determine with a point-in polygon algorithm whether each graph element is within the corresponding region of the display. In another example, the first portion may be a rectangular portion that the user drags across the screen, for instance, from an edge of the screen, and graph elements may be determined to be within the area of the lens by applying a threshold to one of two coordinates in display space of the graph elements, for instance an X or Y position being above or below a threshold corresponding to a current position of the lens.

Next, some embodiments may transform the first portion of the graph, as indicated by Block 20. In some cases, this includes not transforming other portions of the graph, such that the transformation is selectively applied to a subset of the graph elements selected by the user when sizing and positioning the lens. In some embodiments, the various transformations described above and below, either individually or in combination may be applied. In some embodiments, the transformations may be relatively computationally expensive, and latency introduced by such transformations may impair the user experience and make the visualization unresponsive. To improve the operation of the computer system and reduce this latency, some embodiments may pre-calculate each of a plurality of different transformations, for example, each of more than 10, for all of the elements of a graph. Some embodiments may select one or combinations of these precalculated data sets responsive to a user selection of a lens, and some embodiments may select relevant subsets of those precalculated data sets corresponding to the graph elements within the first portion. Thus, some embodiments may avoid calculating the transformations at runtime, thereby providing a more responsive display in some cases, though embodiments are also consistent with runtime calculation of transformations.

Next, some embodiments may cause the visualization of the graph to be updated to present the transformation, as indicated by Block 22. This step may include the operations described above with reference to block 14, except with a different visualization resulting from the transformation being displayed.

Some embodiments may provide a user interface that supports multiple lenses being concurrently applied to a data set, in some cases with some of the lenses overlapping one another to apply multiple transformations to the overlapping area. Accordingly, some embodiments may include receiving another user input to add, move, adjust, or re-size a lens, such as the first lens or another lens, as indicated by Block 24. Examples of moving and resizing and adding are described below with reference to FIGS. 4 through 9. In some cases, these inputs are received via the techniques described above with reference to block 16.

Next, some embodiments may determine whether the requested changes in Block 24 would cause two or more lenses to overlap, as indicated by Block 26. Some embodiments may execute a pairwise determination for every pairwise combination of lenses currently being applied to a data set to identify every instance in which lenses overlap and execute subsequent steps separately, for instance serially or concurrently, for each of those instances of overlap. Overlap may arise as a result of a user moving a lens, resizing a lens, or adding a lens, or a combination thereof. In some cases, lenses may be associated with a third dimension, orthogonal to display screen space, like a "Z" dimension or layers. In some cases, lens transformations may be applied in order of sequence in this dimension, e.g., moving down through layers or up through layers. In some cases, a user may adjust the relative position of the lenses in this dimension by selecting a user input to move the lens down or up one layer or to a bottom or top of a stack of layers.

In cases in which one or more areas of overlap are detected, some embodiments may determine whether the overlapping lenses apply conflicting transformations, as indicated by Block 28. For example, one transformation may specify that a parameter of a clustering algorithm is increased to make clusters less granular, while another transformation may specify that a cluster is to be broken up and individual nodes within that cluster are to be displayed with the color of icons representing those nodes indicating topics associated with the nodes. In this example, where cluster is adjusted and broken up, the two transformations may be determined to conflict, and some embodiments may prevent the conflict. A variety of different techniques may be used to prevent the conflict, including rejecting the user input and displaying a warning, or effecting as much of the user input as can be effected without causing the conflict. For example, where a user request to move a lens to overlap a conflicting lens, some embodiments may move the lens until parameters of the lenses may contact, but reject additional user input that would otherwise cause the lenses to overlap. In another example, one lens may be shown pushing the other out-of-the-way. These operations may be executed in the course of blocking part of the requested change, as indicated by Block 32.

Next, where there is no conflicting transformations, or after changes have been blocked, some embodiments may cause the visualization of the graph to be updated to present the transformation requested with the other user input, as indicated by Block 30. In some cases, this operation may include performing the operations described above with reference to Block 22.

Figure 2:
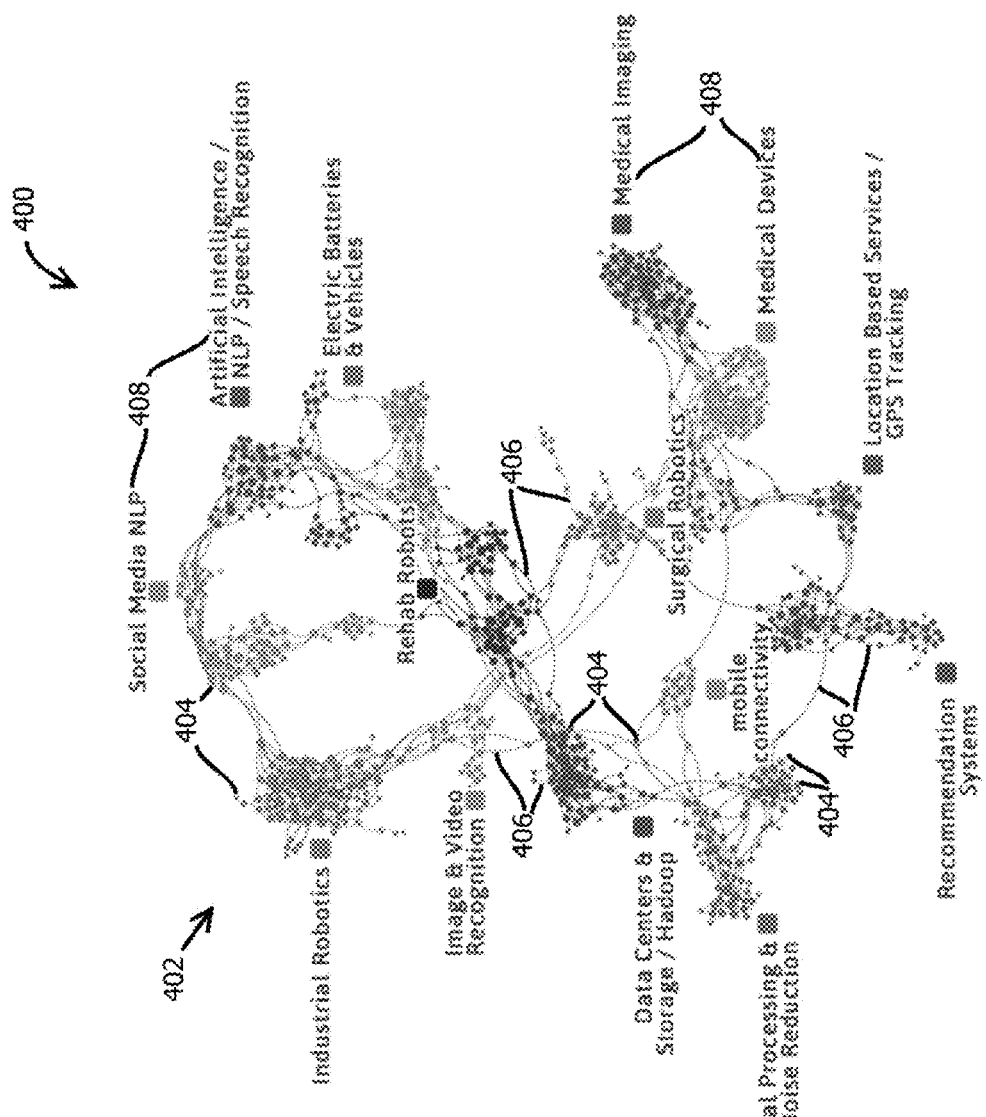
FIG. 2 illustrates an example of a visual representation that may be manipulated in accordance with some embodiments.
Figure 3:
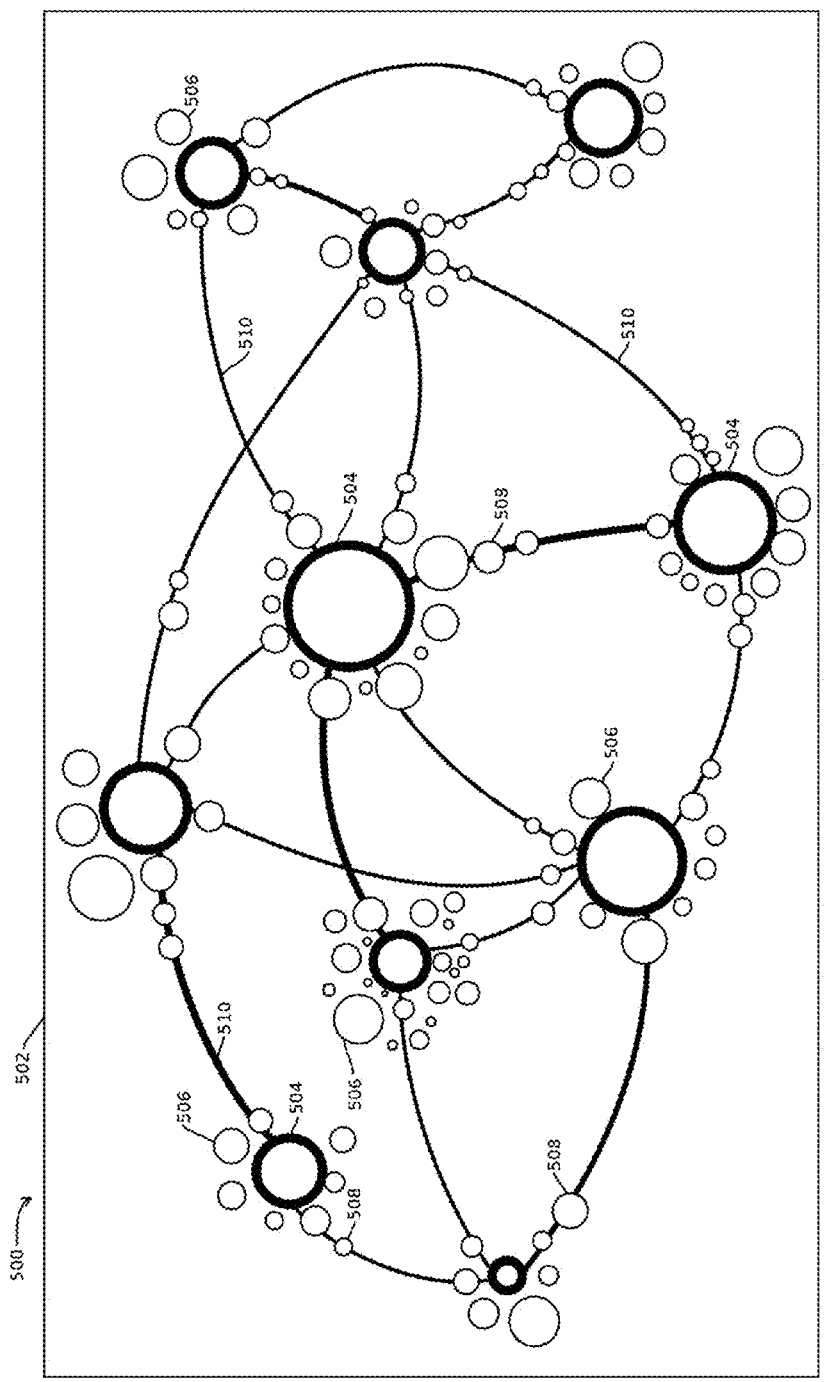
FIG. 3 illustrates another example of a visual representation that may be manipulated in accordance with some embodiments.

The operations of FIG. 1 and user interfaces of FIGS. 5-9 are best understood in view of examples of visual representations of graphs that may be manipulated in some embodiments. FIGS. 2 and 3 show examples of display areas 400 and 500 having the relations of graphs 402 and 502. As shown in FIG. 2, in some cases, nodes 404 may be unclustered, though positioned relative to one another in relation to semantic similarity therebetween, with edges 406 depicted, and various labels 408 shown to characterize collections of nodes.

FIG. 3 illustrates a visual representation 500 within a field-of-view 502. In some embodiments, the field-of-view 502 may be a field-of-view in a web browser of a client computing device, or the field-of-view may be a direction in which a user is looking in a virtual-reality or augmented reality display resulting in a rendered display. In some embodiments, the field-of-view 502 includes a plurality of cluster icons 504 surrounded by node icons 506 and 508. In some embodiments, the node icons 506 and 508 may be nodes deemed significant according to the techniques described above for the respective cluster.

In some embodiments, each cluster icon 504 may represent a corresponding cluster in the underlying graph being visualized. In some embodiments, visual attributes of the cluster icon 504 may correspond to attributes of the cluster, such as size or density of the cluster corresponding to a radius of the icon. In some cases, visual attributes of the cluster icons 504 may be varied according to a variety of different properties, for instance with attributes like color, line weight, drop shadow, saturation, transparency, animated vibrations, and the like corresponding to attributes like a number of nodes in the cluster, a density of the cluster, a topic addressed by unstructured text in the cluster, aggregate statistics of metadata of nodes in the cluster, and the like.

As noted, some embodiments may include node icons 506 and 508 adjacent the cluster icon 504 to which the node icons pertain. In some embodiments, two types of node icons 506 and 508 may be included. In some cases, node icons 506 correspond to nodes that are significant in virtue of metadata or unstructured text attributes of the respective node, such as according the techniques described above. In some embodiments, the node icons 508 may be significant in virtue of edge properties of the respective node, like a particularly high score of a topic of a cluster to which the cluster of that respective node connects, a number of edges connected to that node, a median number of edge weights of edges connect to that node, and the like. In some cases, the edge node icons 508 may be positioned on a line 510 connecting to clusters 504. In some cases, the edges 510 may indicate an amount of edges of nodes in connected clusters extending between the clusters, such as greater than a threshold amount. In other cases, the width or color of the lines 510 may indicate a cooccurrence of topics, a cooccurrence of keywords, cross citation, and the like. In some cases, where edge node icons arise from cooccurrence of topics or other attributes by which clusters are length, the edge node icons 508 may positioned on the line between those respective clusters.

In some cases, the node icons 506 and 508 may be positioned adjacent the respective cluster icon 504, for instance according to a force directed arrangement, such as according to a physics simulation, like those described below, in which the respective cluster icon 504 has a mass with gravity or a charge that attracts the node icons, and a physics simulation may be executed to allow the node icons to settle into a final position. In some cases, the node icons 506 and 508 in the simulation may be modeled as having a larger perimeter than that depicted to maintain some separation or as having a repellent force that engages materially in smaller distances than the force that attracts them to the respective cluster icon.

To simplify the view of FIG. 2, examples of the various types of icons are labeled, but it should be understood that the similar elements have similar designations.

In the illustrated graph, each of the clusters 504 may be positioned relative to one another according to a force directed layout as well. For example, the lines 510 connecting the respective clusters may be modeled according to a physics model, like according to springs, with the clusters 504 being modeled is having a repellent force, placing the springs intention. In some cases, the springs corresponding to the lines 510 may tend to pull the clusters towards one another in the simulation, while the repellent force modeled for the respective clusters 504 may tend to push the clusters apart. In some cases, the simulation may be run to permit the clusters to settle into a relatively low energy state, and that relatively low energy state, such as less than a threshold amount or after a threshold number of iterations of modeling, may be designated as the graphical representation to be displayed to the user. In some cases, the graphical representation may be displayed as animated sequence in which the simulation is executed, and the clusters and other elements are shown in the animation transitioning between a higher energy state and a lower energy state, for instance, by translating across the field-of-view 502 into their final position.

In the illustrated embodiment, the respective icons 506, 508, and 504 are shown as circles, but embodiments are consistent with a variety of other shapes, such as squares, octagons, triangles, and the like. In some cases, the different icons may have different shapes, such as with squares designating nodes and circles dedicating clusters. In some cases, the shapes may be symmetric regular shapes, or in some embodiments, the shapes may have irregular shapes, such as a convex hull of an underlying cluster of nodes, for instance after running a force directed physics simulation of the underlying cluster.

In some embodiments, the line weight of lines 510 may indicate a strength of connection between the clusters, such as an amount of overlapping topics addressed, an amount of edges extending therebetween, and average weight of edges extending therebetween (e.g., edges of nodes in each of the two clusters connected by a line 510), and the like. In some embodiments, the lines 510 may be curved, for instance according to a Bezier curve. In some embodiments, parameters of the Bezier curve may be also constructed according to a physics simulation, for instance with lines extending from the respective clusters generally being repelled one another to cause the respective lines to distribute around the respective cluster icon 504.

As shown in FIG. 32, the respective icons are unlabeled with text. Some embodiments may determine positions of that text in the field-of-view 502. Some embodiments may obtain a set of text labels corresponding to the one or more nodes represented by the icons. In some cases, the text labels may indicate topics scoring relatively highly in the aggregate for respective clusters, topics scoring relatively highly for particular nodes, keywords or other n-grams having relatively high TF-IDF or BM25 scores within the respective cluster or node, or the like. In some cases, such attributes of nodes may be aggregated within the cluster to determine the text associated with the cluster, such as a measure of central tendency or by identifying outliers. Examples of such measures of central tendency include a mean, mode, and median. In some embodiments, the text labels are associated with scores indicating a significance or prominence of the respective text label, such as a score indicating an amount by which a particular topic scores particularly highly for the respective cluster or similar scores for n-grams.

Some embodiments may determine a layout of the icons in the visual representation within a field-of-view. In some cases, the step may include performing the physics simulation to generate a force directed layout. Or some embodiments may use other techniques to determine the layout, such as a spectral layout, or an orthogonal layout, a tree layout, a layered graph drawing, circular layouts, dominance drawing, and the like.

Figure 4:
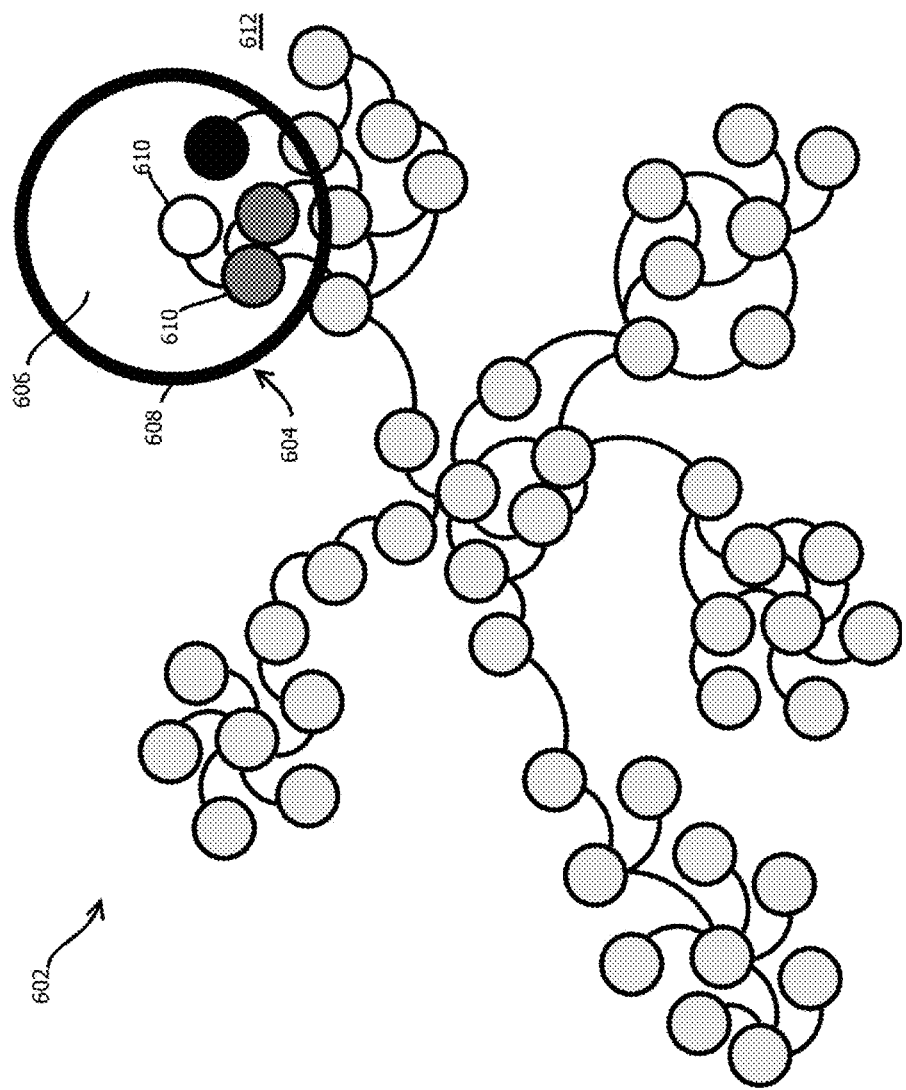
FIG. 4 illustrates another example of a visual representation that may be manipulated in accordance with some embodiments.

The visualizations of FIGS. 2 and 3 may be manipulated via the user interfaces described with reference to FIGS. 4-9. FIG. 4 shows an example visualization 600 of a graph 602 in which a lens 604 has been applied. In this example, the lens 604 includes a region 606 of the visualization 600 selected by the lens 604. The region 606 may be defined by a perimeter 608 of the lens 604. As illustrated, nodes 610 (or other graph elements, in this and FIGS. 5 through 9, like edges, clusters, or links between clusters) may be transformed by a transformation specified by the lens 604 in the region 606, while this transformation is not applied in region 612 outside the lens 604. In the illustrated example, the grayscale value of the interior of the nodes 610 is adjusted based on values of metadata associated with the respective nodes, but any of the above-described transformations may be summarily applied.

Figure 5:
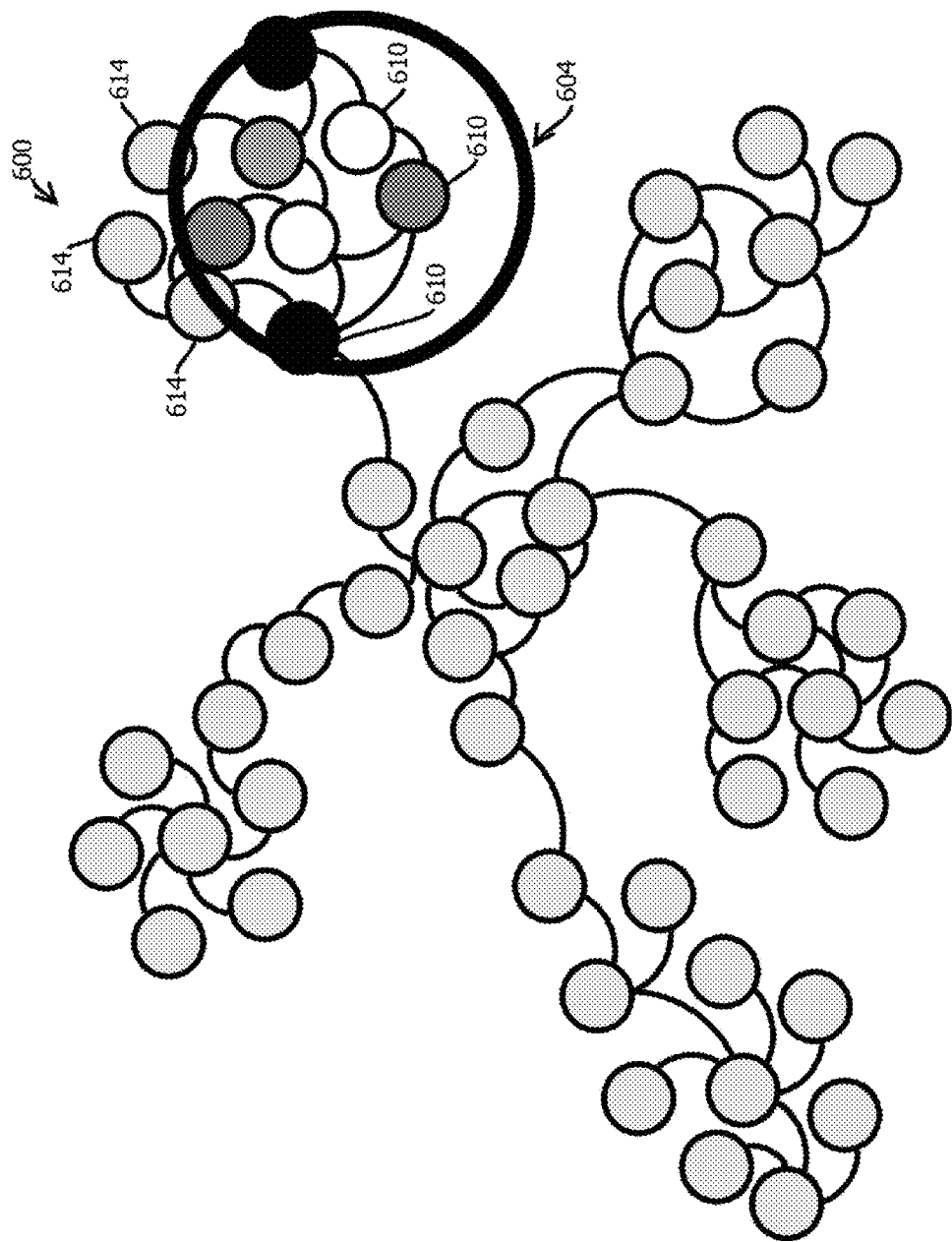
FIG. 5 illustrates the visual representation of FIG. 4 after a user translates a lens.

FIG. 5 shows the visualization 600 after a user has moved the lens 604 to a different position. As illustrated, some of the nodes 614 that were formally within the lens 604 are now outside the lens 604, while other nodes 610 are now within the lens 604. In this example, the transformation of the nodes 614 may be reverted, for example, by reversing the transformation or retrieving old values that preceded the transformation in the visualization 600 and are maintained in memory (e.g., in association with a state corresponding to the values, like an ordered list of transformations applied corresponding to the state, which may be a null value), while the transformation may be applied to other nodes 610. Thus, when a lens is moved or resized, in some cases, some nodes may be unchanged because they remain within the area of the lens, some nodes may be reverted to reverse the transformation or undo the transformation, and some new nodes may receive the transformation that they had not previously received.

Figure 6:
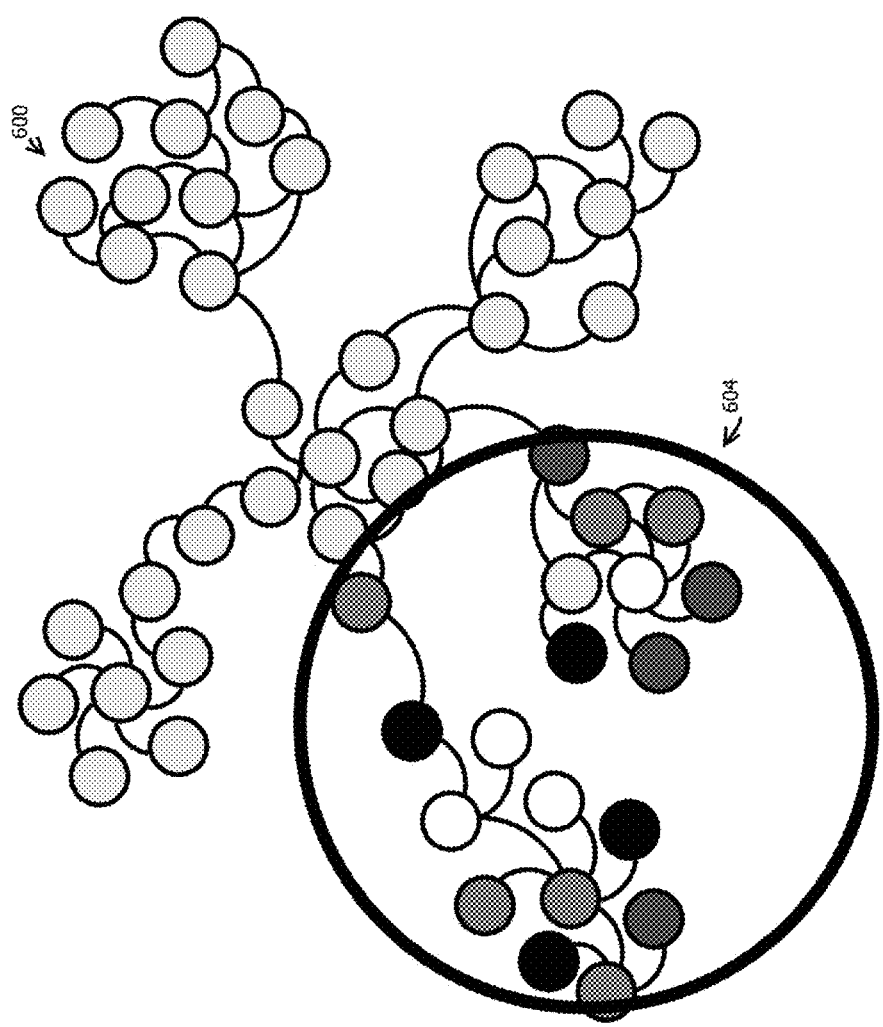
FIG. 6 illustrates the visual representation of FIG. 4 after a user translates and resizes a lens.

FIG. 6 shows the visualization 600 after the lens 604 has been moved and resized by a user, for instance, by touching the perimeter (or internal area) and dragging it to the shown position and then by touching the screen at two locations and spreading those locations apart. In some cases, some embodiments may receive an on-touch event corresponding the two locations and a touch-release event corresponding to the two release locations, and some of those embodiments may calculate a change in distances between the two pairs of locations indicating an amount by which the user spread their fingers apart. Some embodiments may scale the lens 604 based on this distance.

Figure 7:
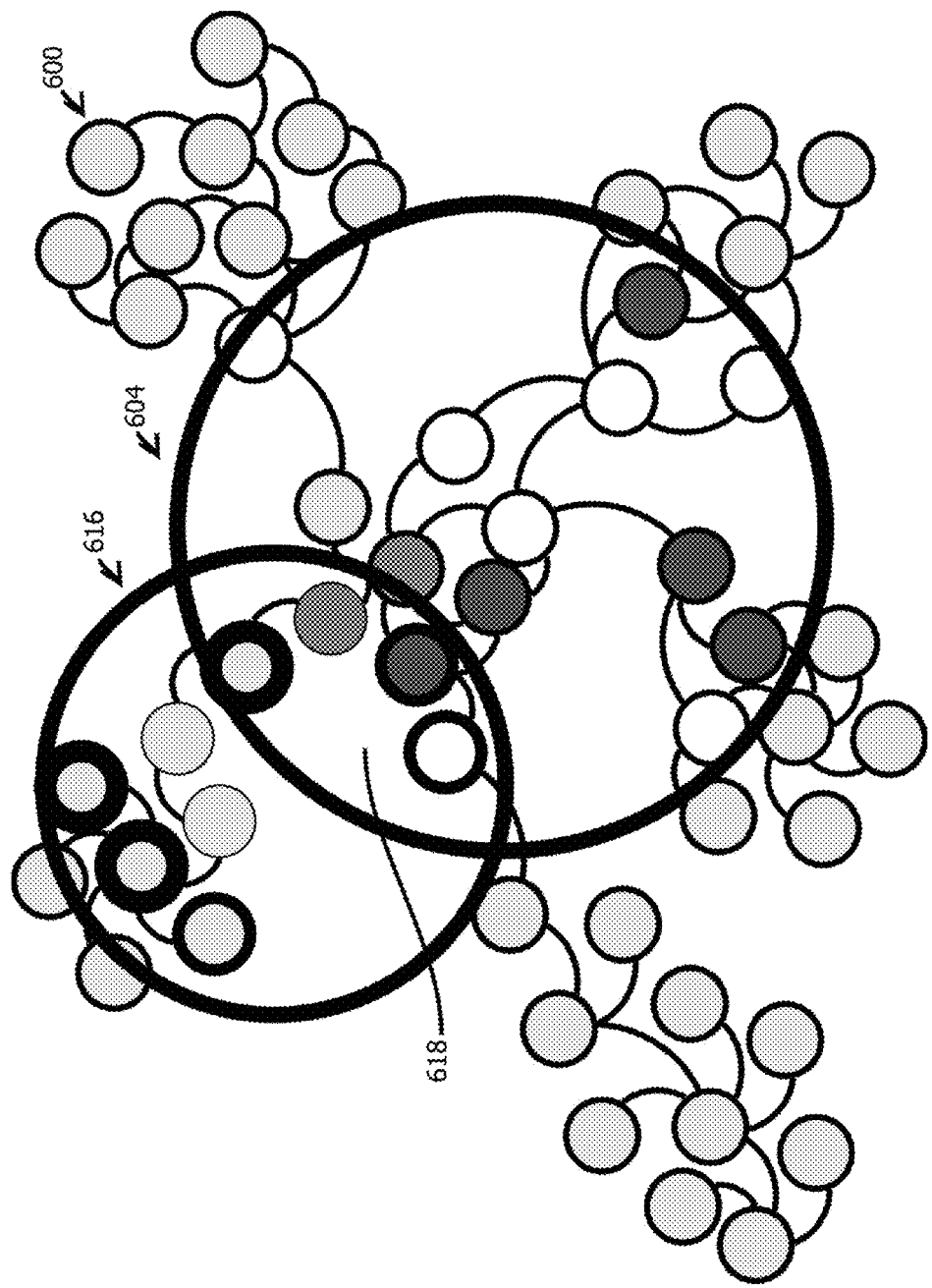
FIG. 7 illustrates the visual representation of FIG. 4 after a user applies two partially overlapping lenses.

FIG. 7 shows an example of the visualization 600 after a second lens 616 has been added and applied concurrently with the first lens 604. As illustrated, the second lens 616 applies a different transformation that changes the visual attributes of the boundaries of the illustrations of the nodes, increasing or decreasing their line weight responsive to a second attribute of the nodes. As illustrated, there may be a region of overlap 618 in which both transformations from the lenses 604 and 616 are applied, causing both the line weight of the boundaries of the icons representing nodes and the grayscale interior of the nodes to vary according to two different attributes of the respective nodes, like amount of social shares and pertinence to a particular topic.

Figure 8:
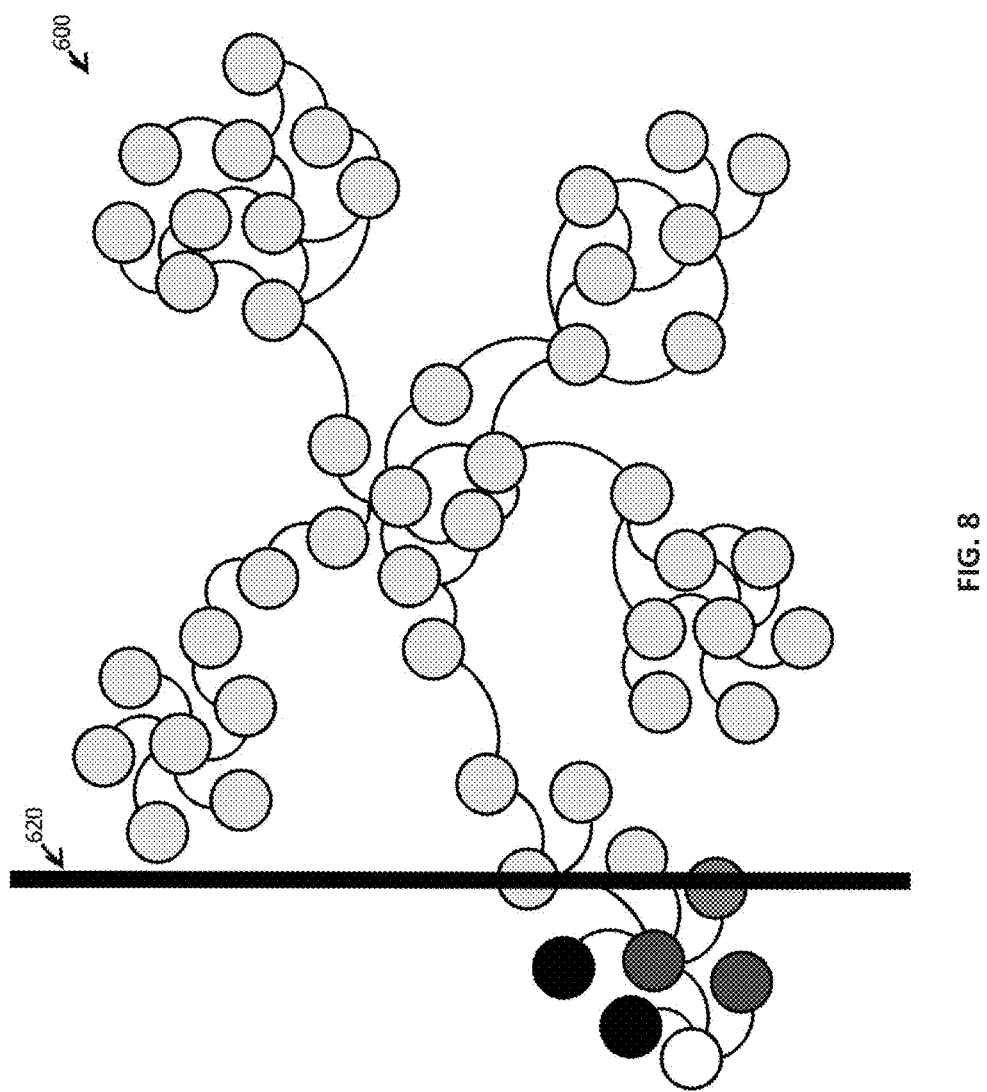
FIG. 8 illustrates the visual representation of FIG. 4 after a user applies a rectangular lens.
Figure 9:
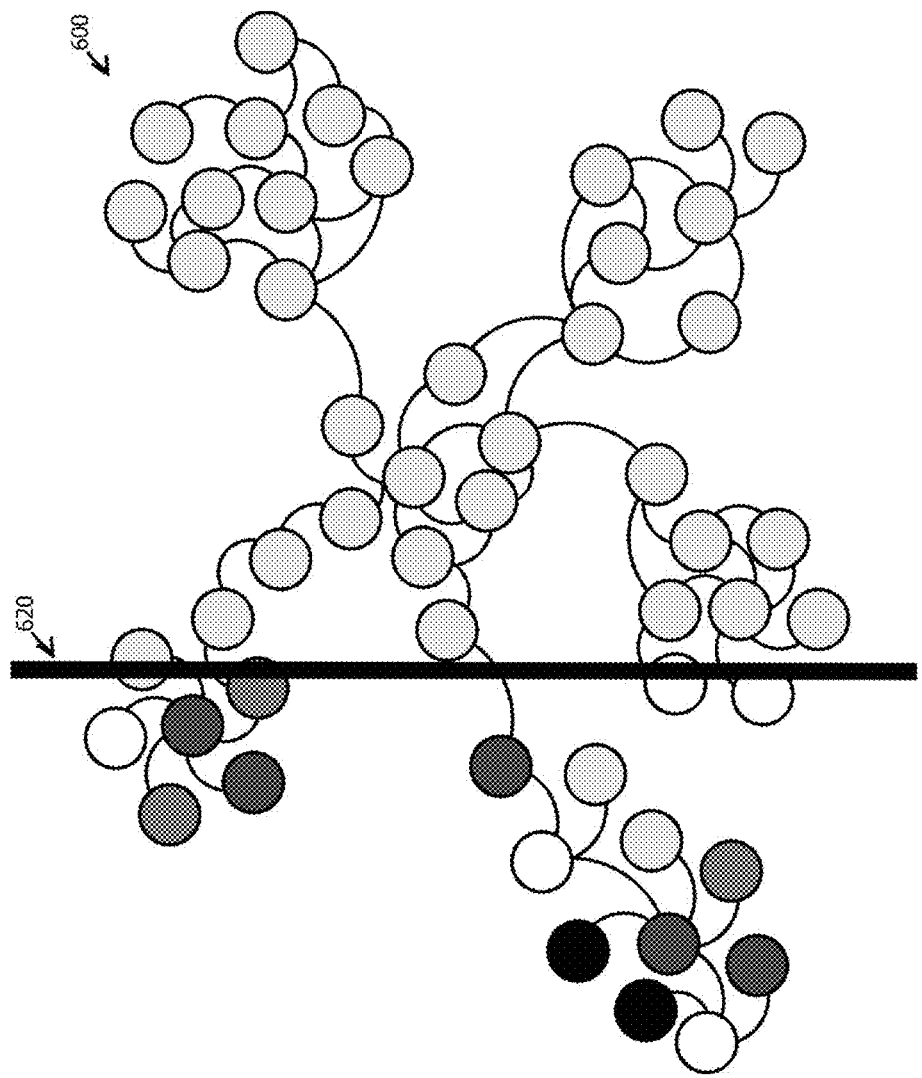
FIG. 9 illustrates the visual representation of FIG. 7 after a user translates the rectangular lens.

FIG. 8 shows an example of the visualization 600 with a different shaped lens 620. As shown in a comparison of FIGS. 8 and 9, the lens 620 may be a rectangular area of the display screen that the user slides from left to right to apply a transformation to nodes to the left of the lens 620 perimeter. In some embodiments, lenses may be pulled left to right, top to bottom, right to left, or bottom to top or in various other directions, depending upon the implementation. In some embodiments, different lens shapes may be combined with one another, for example combining lens 620 with lenses 604 and 616.

A variety of different types of spaces are described herein. It is important to keep in mind the difference between a vector space by which documents (or other entities) are determined to have relationships, such as semantic similarity, and a visual representation space in which a visual representation is displayed. The visual representation space has dimensions corresponding to visual attributes of the appearance of a particular view of the graph, while the vector space has dimensions corresponding to attributes of the underlying entities, like documents, that the graph represents. For example, a single graph within a vector space has multiple different visual representations and different visual representation spaces, in which the dimensions of the visual representation spaces represent different visual attributes.

Figure 10:
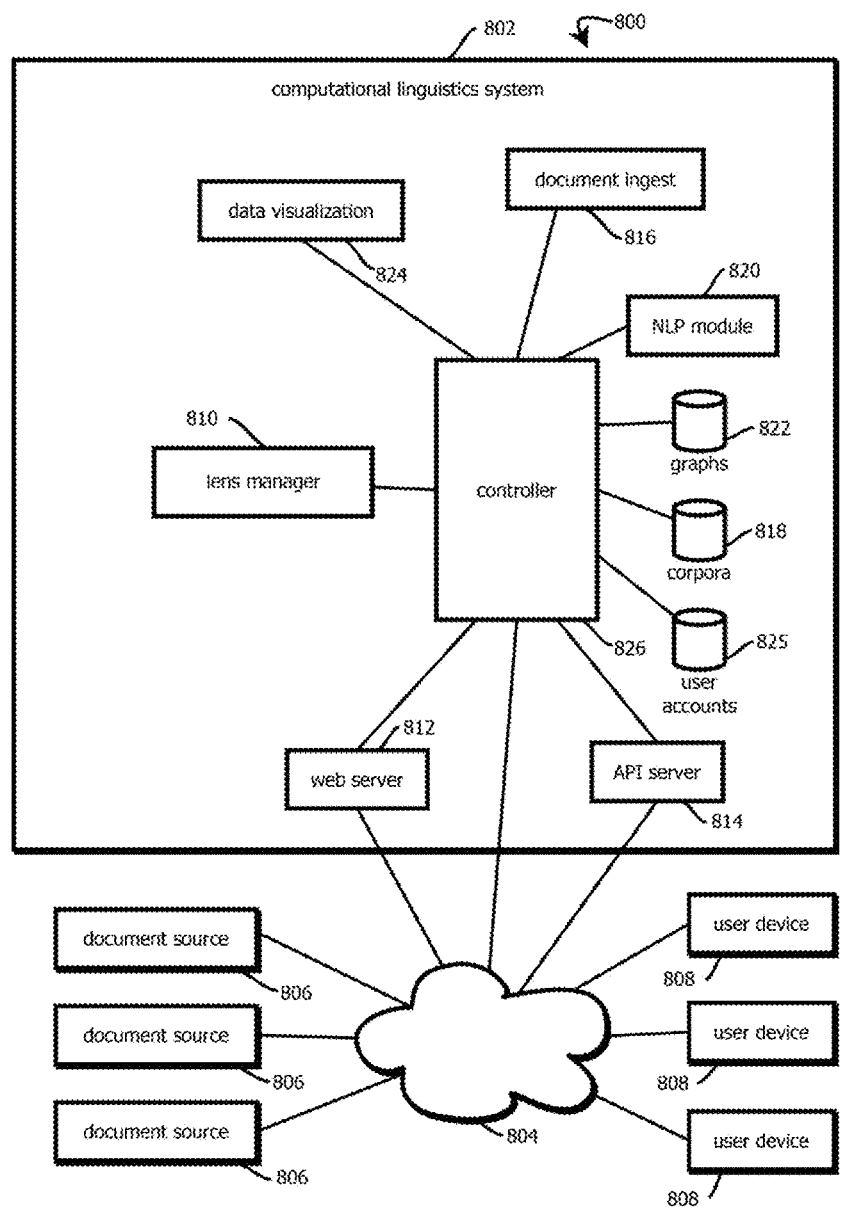
FIG. 10 illustrates an example of a computational linguistics system that may perform the process of FIG. 1 and output the visual representations of FIGS. 2-9.

FIG. 10 illustrates, in block diagram form, the logical architecture of an example of a computing environment 800 in which the above-described techniques may be implemented. In some embodiments, many (and in some cases, most) queries and other analyses are expected to return information about relatively large collections of documents (e.g., more than 1,000, and in many cases, more than 10,000, or more than 100,000). This is the intended use case of some embodiments, which is distinct from many online search engines designed to designate the most relevant document. In view of this distinction, some embodiments of process the results and provide graphical user interfaces that facilitate insights on collections of responsive documents, rather than merely directing the user to individual documents. In many cases, users are more interested in what an entire field has to say about a particular topic, rather than finding, for instance, the most relevant individual document about some topic. Many traditional search engines are not well-suited for this type of analysis, as it is common for search engines to emphasize individual responsive documents rather than attempt to provide some synthesis of the collection of responsive documents. In contrast, some embodiments consistent with the present techniques may both help the user find the needle in the haystack, as well as develop an understanding of the haystack itself.

In some embodiments, environment 800 includes a computational linguistics system 802, the Internet 804, document sources 806, and a plurality of user devices 808, such as personal computers, laptops, or mobile devices having the features of the below-described computer systems. Representative devices are shown, but it should be understood that substantially more devices and instances may be used in commercial embodiments, e.g., more than 100, or more than 1,000 user devices, and more than 10, or more than 100 document sources.

In this example, subscribing users may submit commands (like specifying corpora and topics) to the system 802 (which may be geographically remote) via a web browser executing on user devices 808 and exchanges over the Internet 804. In some embodiments, users may submit commands to view (or otherwise interrogate, e.g., search) trends, entity relationships, sentiment relationships, term relationships, or document relationships (e.g., graphs of such relationships) determined by the computational linguistics system 802 based on unstructured plain text documents. These documents, in some cases, may be retrieved (e.g., downloaded) from content hosted by third party document sources 806, in some cases as batch downloads in advance of queries.

In some embodiments, the computational linguistics system 802 may include a lens management module 810 to perform the above-described techniques, a web server 812, an application-program interface (API) server 814, a document-ingest module 816, a corpora repository 818, a natural-language processing module 820, a graph repository 822, a data visualization module 824, a user-account repository 825, and a controller 826. The controller 826 may coordinate the described operations of the other modules. In some cases, prior to granting access, the controller 826 may confirm a user's credentials against a user account in the repository 825 for security purposes and to verify whether a user account is current, e.g., a subscription fee has been paid.

In some embodiments, the computational linguistics system 802 includes a lens management module 810. In some embodiments, the module 810 performs the process 10 of FIG. 1 described above to implement the user interfaces described above with reference to FIGS. 2-9. In some cases, some of the functionality may be implemented client-side, e.g., with pre-calculated lens transformations held in browser cache after being sent by the module 810 during a session.

In some embodiments, system 802 may include a web server 812 and an application-program interface (API) server 814. These servers may listen to corresponding network ports, maintain session state for various sessions with user devices 808, advance requests and posted data to controller 826, and send responsive data to user devices 808. In some cases, responses may be in the form of web pages, like serialized bodies of markup language, cascading style sheets, and JavaScript™ instructions used by web browsers to render content, like inputs for making requests or data visualizations of query responses. In some embodiments, the API server 814 may be operative to send structured responsive data, like XML or JSON formatted responses to queries and receive machine-generated requests. In some embodiments, the servers may be blocking servers, or the servers may use various techniques to process multiple requests concurrently, e.g., with various asynchronous programming techniques, like by tracking and implementing deferreds or promises.

In some embodiments, the document-ingest module 816 may obtain collections of documents and store those documents in corpora repository 818, which may have analyzed corpora of unstructured plain text documents used to generate the presently described graphs. In some embodiments, the documents may be obtained from different document sources 806, such as remote, third-party repositories of documents, like web servers.

In some embodiments, retrieved and stored corpora are collections of unstructured text documents. In some embodiments, the unstructured text may be included within structured portions of other documents, for example, rendered text within markup instructions in a webpage, or unstructured text embedded in a serialized data format, like paragraphs within an extensible markup language document or JavaScript™ object notation document. This surrounding structure notwithstanding, in some embodiments, at least some, and in some cases most or only, the text analyzed in constructing graph topologies is unstructured text, like human readable plain text in prose form with markup instructions and scripting language instructions removed. For instance, an automated web browser, like Selenium™, may be executed to retrieve web pages, execute scripts to and render markup language construct a document object model of the webpages, and parse visible text from the web pages that is retrievable from ".text" attribute of a DOM object containing the text. Removing the computer-readable portion is expected to cause documents to be grouped according to their content intended to be read by humans, rather than according to the programming library or practices invoked by a developer. Or some embodiments may leave this markup language and scripting instructions in place to analyzed documents according to their mode of construction or to weight terms according to their visual weight when rendered or annotate terms according to their context. In some embodiments, the text may be encoded as Unicode or ASCII text.

In some cases, an analyzed corpus may be relatively large, for example, more than 100 documents, more than 1,000 documents, or more than 10,000 documents, and connections indicating semantic similarity between the documents (or entities, sentiments, terms, or the like, as described below) may be relatively numerous, e.g., more than 5 connections on average between documents, like more than 50, more than 500, or between each unique pair of documents. In some embodiments, each of the documents may also include a substantial amount of text, for instance, more than 100 words, more than 500 words, or more than 2,000 words.

In some embodiments, an analyzed corpus used to construct a graph may be relatively large. For expected use cases of the present inventions, the corpus is larger than would be economically feasible for humans to manually perform the process 10 in reasonable amounts of time, and computers are required to implement the process 10 in commercially relevant intended applications. For example, the corpus may include more than 50 documents, like more than 500, or more than 5,000 documents. Further, in some embodiments, the documents within the corpus may be relatively long, for example, having a median length of more than 50 words, like more than 500 or more than 5,000 words, depending upon the use case.

The necessity of computer implementation, even for relatively small corpora, can arise from the number of documents, the length of documents, or the semantic pairwise interrelationships between the documents, which can give rise to data structures that can grow factorially with each additional document depending upon how aggressively semantic links between documents are pruned. Due to this scaling effect, each additional document in some applications can impose substantial additional computational and memory burdens, and increasing the number of documents even by a small amount can be a nontrivial problem, particularly without the benefit of some of the techniques described herein to expedite computer processing of the analysis and conserve limited memory within a computer system.

In some embodiments, the documents within the corpus may be related in some fashion, for example, all from the same source or related to a category of topics, entities, sentiments, or the like. Examples of corpora include academic literature, like scientific literature, medical literature, economic literature, psychological-research literature, and the like, for instance, from a given journal, university, country, or academic. Other examples include webpages, for example, from businesses, like the 500 highest ranking business entity web sites responsive to a given query, businesses within a given region, business in a given industry, businesses at a given state of development (like emerging businesses), or combinations thereof, like startups in Silicon Valley targeting the shipping industry to give one example. Other examples of corpora include documents hosted in government databases, like the full text patent database hosted by the United States Patent Office, regulatory filings with the Securities and Exchange Commission hosted in the Edgar database, court filings within the Pacer database, Federal Communication Commission filings, United States Food and Drug Administration filings, and the like. Another example of corpora includes various bodies of journalism, like catalogs of newspapers, magazines, and the like. Relevant corpora also include social media posts, for example, microblog posts, blog posts, posts within social networks, and the like, as well as resumes, job postings, and product manuals. Some embodiments may operate on corpa of unrelated documents, such as any corpus containing metadata that could be represented as discrete data points or ranges.

In some cases, the corpus is obtained by processing non-text documents, for example, by performing optical character recognition on image-formatted documents or by submitting photographs to image recognition and description algorithms that return a prose description of photographs. In some cases, the corpus may be obtained without metadata indicating the semantic relationships between documents within the corpus, and these relationships may be discerned, for example, with software provided by Quid of San Francisco Calif., or by performing latent semantic analysis or other distributional semantic techniques to construct the graphs described herein. In some cases, the analysis may be performed by an unsupervised machine learning technique, or some embodiments may train supervised machine learning models (e.g., with stochastic gradient descent) based on a training set, like text data having manually-labeled features. Unsupervised methods are expected to be less expensive and more broadly applicable, as the cost and complexity of feature engineering may be reduced relative to supervised techniques, which is not to suggest that at least some embodiments are not also consistent with supervised learning.

In some embodiments, the natural-language processing module 820 may analyze these corpora and store resulting graphs in the graph repository 822, e.g., at query time or in advance, depending on acceptable latency and resources available, or in some cases partially in advance. In some cases, graphs like those described above may be obtained by subjecting a corpus to various types of distributional semantic analysis, e.g., statistical similarities measures like latent semantic analysis, random indexing, normalized Google™ distance, Best path Length On a Semantic Self-Organizing Map, Vector Generation of an Explicitly-defined Multidimensional Semantic Space, or other techniques by which the distribution of terms in documents is represented as relatively high-dimensional vectors, and semantic similarity is measured by according to similarity of the vectors, for instance, cosine similarity or Minkowski distance. The analysis technique used by some embodiments may be selected based on the type of relationships to be measured, e.g., between entities or terms, versus between larger units of language, like documents or paragraphs. In some cases, a corpus may be analyzed multiple ways, yielding graphs of relationships between entities mentioned in the documents as well as graphs of relationships between the documents.

Graphs need not be labeled as a "graph" in program code to constitute a graph. Other constructs may be used to the same ends and still constitute a graph. It is enough that the arrangement of information (e.g., in program state, storage, or both) contain the attributes of the presently described graphs to constitute a graph having edges and nodes. For example, in an object-oriented programming environment, documents may be mapped to "document" objects, and those objects may have an attribute of a list of semantically similar documents each of which corresponds to a different "document" object and has a similar list referencing other documents, regardless of whether this arrangement is referred to as a "graph" in code.

In some embodiments, to measure relationships between documents (or other larger language units, like paragraphs), each document may be represented by a feature vector in which each value of the vector indicates the presence, number of occurrences, or frequency of an n-gram in the document. N-grams are sequences of one or more terms, e.g., "the" is an example of an n-gram where n=1, "the quick" is another n-gram where n=2, and "the quick brown fox jumped" is another where n=5. In some cases, relatively uninformative terms, like stop words ("the," "a," and "an" being common examples), or terms detected with term-frequency inverse document frequency (TF-IDF) scoring may be omitted.

To calculate TF-IDF for a given n-gram, some embodiments may count the number of times the n-gram occurs within a given document and the number of other n-grams in the document before calculating a frequency with which the term occurs within the document. Some embodiments may also count the number of times the n-gram occurs in a larger collection of documents, such as the analyzed corpus of a sampling thereof, as well as the total number of terms in the larger collection of documents to calculate another frequency with which the term appears in the larger collection of documents. The two resulting frequencies may be compared, for instance, dividing one frequency by the other, to determine the TF-IDF score.

In some embodiments, a form of TF IDF may be calculated that suppresses the marginal effect of relatively high counts of n-grams within documents, for instance with a BM25 score. In some embodiments, the amount (e.g., count or frequency) of occurrences of the respective n-gram in a given document may occur both in a numerator and the denominator of a ratio with the amount of occurrences of the respective n-gram in the larger sample of other documents, for instance as a sum between these values in the denominator and the document-frequency in the numerator. In some embodiments, these values may have a derivative with respect to the amount of occurrences in the respective document that decreases in absolute value as the number of occurrences in the respective document increases, for instance monotonically or substantially monotonically. Thus, in some embodiments, the values may be proportionate or not proportionate to the amount of occurrences of the respective n-gram in the respective document. Suppressing the effect of higher occurrence amounts in the document at issue is expected to yield results closer to the user's intent, though embodiments are consistent with other (e.g., proportional) approaches.

Position of a value in the feature vector may correspond to one n-gram, e.g., the first position of a vector may correspond to the n-gram "jumped over," and documents containing this sequence of terms have a feature vector with value in the first position indicating that this term is present. Documents many be analyzed as a whole, or at higher resolution. For instance, in some embodiments, each document may be partitioned into paragraphs, and then, a feature vector may be constructed for each paragraph, with values of the vector corresponding to the presence of n-grams within the respective paragraph. Vectors need not be labeled as "vectors" in program code to constitute vectors, e.g., ordered lists may constitute a vector in some cases.

Because the universe of n-grams a document could contain is relatively large, and documents tend to use a relatively small portion of these n-grams, feature vectors tend to be relatively high-dimensional and sparse, having a value of zero for most values. To mitigate the burden of high-dimensionality, in some cases, feature vectors may be subjected by some embodiments to various types of dimensional reduction, like indexing, random indexing, or singular value decomposition.

In some cases, a corpus may be represented by arranging the feature vectors into a term-document matrix. For instance, each row or column may correspond to a document, and the values along the row or column may be the feature vector of that document. Thus, rows may represent documents, and columns n-gams, or vice versa.

Or in some embodiments, a document or corpus may be represented as a co-occurrence matrix, where both rows and columns represent n-grams, and values indicate the presence, number, or frequency of instances in which corresponding n-grams occur within a threshold distance of one another in the text. In some embodiments, co-occurrence matrices for documents may be appended to one another to represent a corpus in a higher-dimensional matrix, e.g., in a three dimensional corpus matrix, with each two-dimensional co-occurrence matrix corresponding to a document. Such matrices may be reduced in dimension with a number of techniques, including random indexing. Matrices need not be labeled as a "matrix" in program code to constitute a matrix, e.g., an ordered list of ordered lists may constitute a matrix.

In some cases, a variety of types of relationships may be processed with some embodiments. For instance, semantic similarity or relatedness of entitles mentioned in documents, sentiments expressed in documents, or terminology in documents may be determined with computational natural language processing of unstructured plain text corpora. In some embodiments, a corresponding graph may be constructed, with documents, paragraphs, entities, sentiments, or terms as nodes, and weighted edges indicating relationships, like similarity, relatedness, species-genus relationships, synonym relationships, possession relationships, relationships in which one node acts on another node, relationships in which one node is an attribute of another, and the like. In some cases, the edges may be weighted and directed, e.g., where the relationship applies in one direction and can vary in magnitude or certainty.

Analyses of such matrices may entail operations like insertion, multiplication, and addition. As noted above, in some embodiments, matrix operations may be prohibitively slow or memory intensive for a larger datasets. A number of techniques may be used to expedite these operations and reduce memory consumption. In some embodiments, to expedite operations, matrix operations may be performed in a single instance of a computer system, for example, within a single memory address space of a single operating system, and in some cases, by holding some or all of the matrix data in program state concurrently to avoid disk access or network access latency penalties. Or, some embodiments may distribute operations on additional computing systems, which is not to imply that any other feature described herein may not also be omitted. In some embodiments, the computer system may be configured with a relatively large amount of random access memory and on-chip cash memory to these ends.

In some cases, some of the sparse-matrices described above may consume a relatively large amount of memory using some traditional techniques. To conserve memory, some embodiments may compress the sparse matrices, for example, by decomposing a matrix into vectors, and translating the vectors into an index indicating which vector scalars have a nonzero value and corresponding indications of those values. Some embodiments may compress such vectors with run-length coding of values of those values that are zero. Some examples may compress sparse matrices as a dictionary of key, a list of lists, a coordinate list, a compressed sparse row, or a compressed sparse column. In some cases, such matrices, or portions of sparse matrices, may be expanded for some vector operations and then re-compressed after and before, respectively, the sparse matrices, or portions thereof, are moved upward in a memory hierarchy towards a processor.

Various encodings may be selected to improve the functioning of a computer system. In some cases, values of matrices, like weights, may be normalized, for example, ranging between zero and one or as eight, 16, or 32 bit binary values having a number of digits selected in view of an operating system, register size, memory bust size, and other hardware constraints of a computer system upon which the above processes are to be run to expedite operations and conserve memory.

Some embodiments may determine document similarity based on latent semantic analysis of unstructured text in the documents. For instance, some embodiments may create a term document matrix of the documents. Then, the term-document matrix may be transformed with singular value decomposition (SVD) to map documents to concepts expressed by the terms. Documents having similar concepts may be deemed similar, e.g., based on similarity of concept vectors for the documents yielded by SVD. In some cases, terms appearing with more than a threshold frequency in the documents may be determined and weighted according to TF-IDF. In some cases, the resulting weighted term document matrix may be decomposed by determining two vectors, that when multiplied, approximate the matrix. In some embodiments, error between the approximation and the matrix may be determined, and the error may be decomposed by determining two more vectors that when multiplied approximate the matrix of errors. This process may be repeated until an aggregate error is determined to be smaller than a threshold. A threshold number (e.g., the second and third) of the resulting vectors may correspond to dimensions in a concept space, where the concepts that emerge correspond to co-occurrence of terms in documents indicated by clusters in the space. Documents may be clustered according to their corresponding vectors in the concept space, or similarity of documents may be determined by some embodiments by comparing their respective vectors in this space, e.g., based on cosine similarity or other measures.

In some cases, high dimensional sparse vectors may be reduced in dimension with random indexing. For instance, document text may be represented in a co-occurrence matrix, where rows represent n-grams, columns represent adjacent n-grams (like within a threshold number of words in the text), or vice versa, and values represent presence, number, or frequency of instances in which corresponding terms are determined to be adjacent one another in the text. In some cases, to reduce memory consumption of sparse vectors in such a semantic similarity analysis, a co-occurrence matrix may be created by representing adjacent n-grams as vectors that are smaller (e.g., substantially smaller) than the number of potential adjacent n-grams and are made generally distinguishable from one another by randomly (e.g., pseudo-randomly) assigning values, like 0, +1, or −1. As adjacent n-grams are encountered during parsing, corresponding rows or columns of n-grams in the co-occurrence matrix may be updated by summing current values of the row or column with corresponding values of the adjacent n-gram vector. Similarity of n-grams (and corresponding entities) may be determined based on similarity of resulting vectors in the co-occurrence matrix, e.g., based on cosine similarity.

In some cases, similarity (or other relationships) between larger language units may be determined. For instance, in some cases, a feature vectors may be determined for documents in a corpus. Some embodiments may execute a density-based clustering algorithm, like DBSCAN, to establish groups corresponding to the resulting clusters and exclude outliers. To cluster according to vectors, some embodiments may iterate through each of the vectors reflected in the records and designate a vector as a core location in vector space if at least a threshold number of the other vectors in the records are within a threshold distance in vector space. Some embodiments may then iterate through each of the vectors and create a graph of reachable vectors, where nodes on the graph are identified in response to non-core corresponding vectors being within a threshold distance of a core vector in the graph, and in response to core vector in the graph being reachable by other core vectors in the graph, where to vectors are reachable from one another if there is a path from one vector to the other vector where every link and the path is a core vector and is it within a threshold distance of one another. The set of nodes in each resulting graph, in some embodiments, may be designated as a cluster, and points excluded from the graphs may be designated as outliers that do not correspond to clusters.

In some cases, the graph may be a clustered graph in which collections of nodes are grouped into clusters according to various criteria, such as based on edges connecting the nodes. In some cases, clusters may be clustered according to a graph clustering algorithm, like a Markov cluster algorithm. Some embodiments may randomly walk the graph, e.g., with probabilities weighted according to edge weights, and record other nodes visited, in some cases including self-referential edges. Based on these random walks, some embodiments may form a transition probability matrix indicating the probability of traveling from one node to another. Some embodiments may normalize the transition probability matrix. Some embodiments may then iteratively expand the matrix by taking the eth power of the matrix and then inflate the matrix by taking the inflation of the resulting matrix according to a configurable parameter. Some embodiments may repeat these iteration until the matrix converges to reveal clusters according to positive values along rows of the converged matrix.

In some cases, when performing these operations, movements within a memory hierarchy of a computer system (e.g., from storage, to dynamic random access memory, to L3 cache, to L2 cache, to processor registers) may be relatively slow, and memory space may be particularly limited higher in the hierarchy, closer to the processor. For example, access to data stored in registers of a processor, such as a CPU or graphics processing unit, may be relatively fast, while the amount of available storage may be relatively low. Level 2 and level 3 cache, respectively, may offer trade-offs of increasing magnitude, exchanging slower access times for greater storage space. Similarly, dynamic random access memory may offer even greater storage, though access times may be several orders of magnitude slower than the registers or cache memory, and persistent system storage, such as a hard disk or solid-state drive) may extend this trade-off even further. In some embodiments, matrices may be large enough that during operation substantial portions of the matrix, for example, most of the matrix, cannot fit into the higher levels of a memory hierarchy, and portions of the matrix may be swapped in and out of the higher levels of memory hierarchy during operations on those portions. As a result, in some embodiments, movement of data between levels of the memory hierarchy may account for a substantial portion of the computing resources, e.g., time and memory, consumed by a matrix operation. As some use cases reach relatively large scales, this consumption of computing resources may become prohibitive.

In some embodiments a blocking algorithm may be executed during certain matrix operations, for example, when multiplying two dense matrices or a dense matrix by a sparse matrix, to improve the functioning of the computer system and reduce the amount of time spent shifting data back and forth between levels of a memory hierarchy. In some embodiments, upon initiating a matrix multiplication, one or both of the matrices may be subdivided into blocks (e.g., tiles), each having a plurality of contiguous values within the respective matrix within a plurality of a sequence of rows and columns, for instance, those values that are both in the first 8 columns and in the first 8 rows might constitute one tile. In some embodiments, tile size may be selected based on the amount of available memory at various levels of a memory hierarchy, such that a given tile can fit within a targeted level of the hierarchy, like the level 2 or level 3 cache. Next, some embodiments may iterate through the tiles, loading the tiles into a higher level of the memory hierarchy, and then performing operations with that tile. In some embodiments, a given tile, after being loaded into the higher level the memory hierarchy, may be applied to update each implicated value of a product matrix. In some cases, the values of the product matrix may be initially set to zero, and then those values may accumulate updates as tiles are loaded and processed, until all of the tiles have been processed, and the final value of the resultant matrix is known. In some cases, updating a given value may include summing an existing value with one or more products of values within a tile that has been loaded into the higher level of the memory hierarchy. References to higher and lower levels of memory hierarchy, rather than specific levels, are intended to indicate the applicability of this approach to different levels of the hierarchy, for example, the higher and lower levels may be level 2 cache and dynamic random access memory respectively or level 2 cache and level 3 cache respectively. In some cases, multiple levels of tiling may be performed, e.g., a tile loaded into cache may be sub-divided into register-sized sub-tiles. In some cases, some of the techniques for accelerating matrix or vector operations or conserving memory may be implemented by invoking appropriate sequences of commands in a basic linear algebra subroutine library, like level 1, 2, or 3 commands.

Some embodiments may learn a set of topics and n-grams pertaining to the respective topics, and label documents, collections of documents, and n-grams according to scores indicating a pertinence of the topic. In some embodiments, the number of topics may be relatively large, for example, more than 10 topics, and in many cases substantially more, like more than 50, more than 500, or more than 1,000 topics in relatively fine-grained analyses. In some embodiments, the topics may be arranged in a hierarchical taxonomy, for instance, with "health" at a top level, "heart health" and "lung health" at an intermediate level, and "heart attacks" and "hypertension" at a lower level of the former. In some embodiments, the topics may be labeled topics in the sense that each topic has a term that refers to the concept or set of concepts to which the topic pertains, like the topic name "health." In other embodiments, the topics are unlabeled, for instance, corresponding to a collection of concepts or a concept that are inferred to be distinct from other collections of concepts, but these concepts or collections of concepts may be unnamed (e.g., after topics are identified but before topics are labeled) beyond merely being recognized as distinct by some embodiments. For example, some unsupervised learning techniques may group or score keywords according to a specified number of topics, without labeling each of those topics.

In some embodiments, each topic may be associated with a set of n-grams, such as one, two, three, four or more consecutive words appearing in natural language text. For example, the phrase "quick brown fox jumped over the lazy dog" includes bi-grams of "quick brown," "brown fox," "fox jumped," and so on, as well as tri-grams like "quick brown fox," "brown fox jumped," and so on. Some embodiments may include n-grams up to some threshold, like 1 (for keywords), 2, 3, 4, or 5. In some embodiments, the n-grams may be obtained from the text of a set of documents for extracting topics. In some embodiments, the set of documents may be the corpus obtained, a subset of the corpus (e.g., a random sample deemed large enough to yield statistically significant results while expediting processing), an overlap with the corpus, or a different set of documents. In some embodiments, the n-grams may be each unique n-gram present in the set of documents, in some cases excluding stop words.

In some embodiments, each topic may have a topic-specific score associated with each of these n-grams, for instance, in the form of a topic vector, where dimensions of the vector corresponds to each of the topics, and where values of each of the dimensions indicate an amount by which the corresponding n-gram is predictive of the corresponding topic. For example, a topic vector for the topic of "basketball" may include a dimension corresponding to the n-gram of "backboard" and that n-gram's dimension in the vector may have a score of 0.95 indicating a relatively strong predictive value for inferring that the n-gram refers to the topic of "basketball." The same topic vector may include another dimension corresponding to the n-gram of "court," and the n-gram may have a score of 0.3, illustrating a much weaker predictive value, for instance, due to this n-gram being used in association with many other topics, like a court of law. Similarly, the same set of topics may include the topic of "law," and the n-gram of "court" may have a score for this topic that is higher, for instance 0.6, indicating that the conditional probability of "law" being exhibited when the n-gram of "court" is observed is higher than the conditional probability of "basketball" being exhibited when the same n-gram is observed.

Encoding the topic-specific scores of the n-grams in the form of a topic vector is expected to consume less memory than systems that explicitly record key-value pairs for each topic and each n-gram and reduce the amount of data shifted up and down a memory hierarchy in a computer system or between computer systems, thereby yielding faster computations, though embodiments are also consistent with these slower approaches. Some embodiments may encode the topic vectors as tuples. In some cases these scores, and the other scores described herein, may be encoded as binary values of some length selected based on a specification of an operating system or a central processing unit (CPU), such as an 8-bit value, a 32-bit value, or a 64-bit value, each corresponding to, for instance, an address space size of an operating system, a number of registers in a CPU, or a unit of memory that moves as a block between one level of memory hierarchy and another.

In some embodiments, to conserve memory, the set of n-grams associated with each topic may be pruned. For example, in some cases, n-grams having a topic-specific score that does not satisfy a threshold, for instance, is less than a threshold value (e.g., 0.7), may be omitted from the set of n-grams corresponding to the respective topic. In some cases, the correspondence of n-grams after pruning to topics may be indicated with a binary value of zero or one in a topic vector, with dimensions that satisfy the threshold being designated with a 1 and dimensions that do not being designated by a 0. In some cases these topic vectors are expected to be relatively sparse, and some of the techniques described below for expediting computing operations with sparse vectors may be employed to expedite computations.

In some cases, the topics, the set of n-grams, and the scores for those n-grams may be explicitly provided as an input, for instance, by a user configuring the system with hand-coded topic data. However, in many cases, users are seeking document relationship graphs because the users are seeking an understanding of a relatively large corpus and the topics therein. In many of these use cases, the user will not have on hand a defined topic set, nor will it be feasible for a user to accurately specify a topic set well calibrated for interrogating the corpus of documents.

In some embodiments, the set of topics, the set of n-grams corresponding to those topics, and topic specific scores for each of those n-grams may be inferred from a set of documents, like the corpus itself, a set with overlap with the corpus, or a different set of documents. In some cases, supervised learning may yield such a data set. For example, in some embodiments, a user may supply a training set of documents in which the documents have been labeled with the topics exhibited by the respective documents. In some embodiments, the labeling is relatively granular, with multiple topics appearing in the documents, and subsets of the documents labeled as pertaining to particular topics. For example, such labels may indicate a range of words in the document by word count, for instance, with a start word count and an end word count, and this range may be associated with an identifier of a topic and a score indicating a pertinence of the topic to the range of text (e.g., from 0 to 1). In other cases, the labeling may be less granular, and a single topic label may be applied to an entire document, or a collection of topic labels may be applied to an entire document, in some cases with a binary indication, or in other cases with a cardinal score indicating a pertinence of the respective topics to the respective document.

Based on this training set, for each topic, some embodiments may learn topic-specific scores for each n-gram, the scores indicating an amount that the corresponding n-gram predicts the corresponding topic. A variety of different techniques may be used to learn these topic-specific scores. In some embodiments, the result of learning may be a topic model (e.g., a mapping of topics to a set of n-grams, each n-gram having a topic-specific score indicating a conditional probability of the respective topic being exhibited upon observing the respective n-gram in a document) having parameters that indicate the topic-specific scores. In some embodiments, the topic model may be formed by arbitrarily assigning topic-specific scores to the n-grams, for instance by randomly, like pseudo-randomly, assigning such scores. Next, some embodiments may iteratively determine whether the model parameters agree with the labels in the training set and adjust the model parameters to increase an amount of agreement (or determine whether the model parameters disagree and adjust the model parameters to reduce an amount of disagreement). In some cases, these iterations may continue until an amount of change between iterations is less than a threshold or a threshold number of iterations have occurred. For instance, some embodiments may adjust the model parameters according to a stochastic gradient descent. In some embodiments, the topic-specific scores are determined with supervise learning, based on the training set, with a support vector machine. In some embodiments, the topic-specific scores are determined with supervise learning, based on the training set, with a Bayesian topic model.

In some embodiments, the topic-specific scores may be determined with unsupervised learning. In some cases, it can be relatively expensive and time-consuming to obtain the training set, or the available training sets may not be known to have the appropriate type of subject matter to yield topics relevant to the corpus at issue. In such scenarios, unsupervised learning may yield the set of topics, n-grams pertaining to the topics, and corresponding topic-specific scores without requiring a training set be provided.

Some embodiments may ascertain topics in documents, sets of n-grams (e.g., keywords, or bi-grams or tri-grams) pertaining to each topic, a score for each n-gram for each topic indicating how predictive the respective n-gram is of the topic, and an score for each topic for each document indicating an amount the topic is exhibited by the document. Some embodiments may perform this analysis with an unsupervised learning technique, e.g., without incurring the cost of obtaining a manually labeled training set of documents where humans tag text as pertaining to topics or supply topic-n-gram correspondence values.

For instance, some embodiments may execute a form of Latent Dirichlet Allocation. In some cases, a number of topics to be ascertained may be supplied, e.g., by a user indicating that 2, 3, 5, or 50 topics are to be ascertained. Next, some embodiments may arbitrarily (e.g., randomly, like pseudo-randomly) designate each n-gram in each document as pertaining to one of the topics. Then, some embodiments may iteratively adjust the designations to make n-grams that, within the set of documents, tend to co-occur in a document more likely to be designated with the same topic.

For example, some embodiments may, for each document, for each n-gram in the respective document, for each topic, determine 1) an amount (e.g., proportion relative to a total number of n-grams of the same length) of n-grams in the respective document designated as pertaining to the respective topic, and 2) an amount (e.g., proportion relative to all documents) of all instances of n-grams (e.g., of the same length as the respective n-gram) in all of the documents designating as pertaining to the respective topic. And then for the respective document and n-gram, some embodiments re-designate the respective n-gram as pertaining to a topic selected according to a probability of the topics.

The probability of the topics may be 1) the conditional probability of the respective topic being exhibited given the respective document multiplied by 2) the conditional probability of the respective n-gram occurring given that the respective topic is exhibited (as indicated by the current distribution of assignments). In some embodiments, this operation may be repeated until the designations converge, e.g., until less than a threshold amount of designations change, or a sum or measure of central tendency of the second conditional probability changes by less than a threshold amount, or until a threshold number of iterations have occurred.

In some embodiments, for larger document sets, or larger documents, the operations may be relatively computationally complex and resource intensive. Accordingly, some embodiments may perform the analysis in a distributed computing framework, like Apache Hadoop or Spark, e.g., with documents or portions of documents being assigned to different nodes (e.g., computing devices or threads), and each node determining document-specific values (e.g., counts of n-grams or topic-pertinence, etc.), before the document-specific values are aggregated, e.g., to determine conditional probabilities for a population of documents. In some cases, some tasks may be assigned to nodes by document (e.g., sending each node a subset of documents), while other tasks may be assigned to nodes by topic (e.g., sending each node a subset of topics). In some cases, the number of nodes may be relatively large, e.g., exceeding 10, or 100 nodes. Sending instructions to the distributed data, rather than moving data between computing devices where instructions are static, is expected to yield faster results for particularly large data sets. Or some embodiments may perform these operations in a single thread or a single computing device.

Some embodiments may account for changes in topic associations with n-grams over time. In some cases, a plurality of sets of n-grams pertaining to a given topic may be determined, with each instance in the plurality being determined based on a different set of documents, each set of documents being associated with a duration of time, such as continuous ranges of time, like by year. In some cases, a user may select a particular time range for a particular topic or set of topics, and the corresponding time-range specific topic vectors may be selected for subsequent processing.

Some embodiments may learn multiple sets of topics, with each instance corresponding to a different granularity of topics. For instance, some embodiments may execute one of the above-described unsupervised techniques for learning a topic model with a first number of topics, like five, to yield a first set of topics and n-grams pertaining to the respective topics, and then execute the same technique with a different number of topics, like 50, to yield a second set of topics and n-grams pertaining to those respective topics, with greater granularity. Some embodiments may provide a user interface by which a user may select a granularity before selecting a topic, and corresponding topic vectors may be determined in response to the user selection.

In some embodiments, whether the topics and associated values are obtained with supervise learning, unsupervised learning, or explicitly provided, each topic may be specified by a topic vector, and the collection of topic vectors may form a topic matrix, with one dimension corresponding to topics (e.g., columns of the matrix), another dimension corresponding to n-grams (e.g., rows of the matrix, or vice versa). In some embodiments, the topic-specific scores may be normalized across topics. For instance, some n-grams may be relatively common generally and have a high correspondence with each of the topics, in which case, some embodiments may reduce an amount by which the corresponding n-grams are indicated to predict the topics relative to n-grams that have relatively isolated correspondence to relatively few topics. In some cases, such normalization may emerge in the process of learning topic-specific scores, or some embodiments may impose such normalization, for instance, by dividing each topic-specific score for each n-gram with the sum of topic-specific scores for the respective n-gram across all of the topics. In some cases, visualizations may reflect topics associated with corresponding elements.

In some embodiments, the data visualization module 824 may be operative to prepare data visualizations for display on user devices, e.g., visualizations of the graphs described herein. In some cases, such visualizations may include physics-based arrangements of nodes within a display, like a force-directed layout. In some cases, graph generation and visualization preparation takes place on system 802, and resulting interactive visualizations run (e.g., entirely) in a web browser of a user device. In some cases, this entails displaying and manipulating thousands of vertices and edges in an environment on user devices not known for speed. At the same time, in some use cases, users desire a relatively large amount of data on display, while keeping a responsive frame rate. To increase frame rate, some embodiments may use various techniques to optimize the network visualization and make the computer system run faster, including invoking WebGL commands to enlist a user's GPU in rendering a web page and pre-processing.

Graphs of real-world information are often relatively intricate. In some embodiments, visualizations may support real-time (e.g., in this context, with less than 500 ms latency) interactions with relatively large numbers of interactive objects, e.g., more than 500, like more than 1,000, and in some cases as many as 20,000 interactive objects with near zero latency. In some embodiments, this speed is accomplished by pre-processing physics models of graph layouts with a graphical processing units (GPUs) of the system 802, to reduce the computational burden on less powerful CPUs executing browsers on user devices. In some cases, displays may be relatively high dimensional, e.g., various visual attributes, like line weight, icon size, color, transparency, drop shadow offsets, or properties of physical models, like inertia, friction, attractive forces, repulsive forces, momentum, frequency of oscillation, and the like, may be mapped to different dimensions like those discussed above, e.g., similarity, relatedness, sentiment, and the like. Connections tend to be more relatively complicated and irregular, and embodiments often do not determine the visual shape of the graph ahead of time. Indeed, graph isomorphism provides for a relatively large number of visual arrangements of otherwise identical graphs, but many arrangements are relatively un-informative and difficult to visually parse to a human user consuming the resultant data.

To visualize graph relations, some embodiments of module 824 may arrange vertices (also referred to as nodes) and edges using a physics simulation that mimics the stretching of spider webs. Some spider-web-inspired representations may model interactions between each pair of vertices as a Coulomb-like repulsion and an additional Hooke-like attraction in the presence of an edge between the pair. A relatively weak gravitation-like force may be modeled to prevent separate components and isolated vertices from venturing too far from the network's center of mass. Thus, some embodiments may use this physics-based network layout. In some cases, the parameters and initial conditions of the physics based model may be determined by module 824, and instructions for executing the model and adjusting the model based on user input may be sent to the user device, e.g., in the form of JavaScript™ instructions that model, for instance, a user selecting and dragging a node as a force applied to the physics model. Embodiments are expected to appear relatively natural, and the hierarchy of a network's structure is expected to be readily apparent; both small and large network structures are exposed, which is expect to allow users to study relationships between groups of vertices on different scales.

Running a physics simulation in a user's browser can easily exceed the available computing resources, as the simulation can be inherently resource-intensive for larger, highly connected data sets. To mitigate this issue, some embodiments may exploit phenomena expected to arise as the size of the data scales. It is expected that, in some embodiments, the number of time steps consumed to achieve equilibrium starting with a random configuration of vertices scales linearly with the number of vertices. That is undesirable for presentation purposes (though some embodiments are consistent with this approach, particularly for smaller data sets). To mitigate this, some embodiments may arrange for initial conditions of the simulation so the equilibrium is attained faster.

To select initial conditions of the physics-based animation of this n-body system, some embodiments may perform a gradient descent optimization. Some embodiments may compute the gradient of the modeled system's energy (e.g., based on the forces affecting nodes), integrate that to compute momentum, and move the particles in the simulation representing nodes accordingly. Initial conditions of the gradient descent may be selected strategically in some cases to mitigate the effects of local minima in what is expected to be a relatively rough energy landscape (though embodiments are also consistent with random selection of initial conditions, like with a stochastic gradient descent). For instance, some embodiments may seed the simulation with a vertex configuration that is in the vicinity of the final destination. To this end, some embodiments may execute a discretized version of the problem and search through all vertex configurations on a 2D grid.

This process is still of combinatorial complexity, however, and may be generally too expensive for some larger graphs. To mitigate this issue further some embodiments may simplify the search space to one dimension with space filling curves, like a z-curve or Hilbert curve that cover a 2D region of space with a one-dimensional curve. Such space-filling curves may be constructed via an iterative process, whereby at each step of the iteration the curve is refined at ever-finer scales. By ceasing iterations at a finite step, some embodiments may obtain a curve with just enough points to accommodate the data at issue. Further benefits, in some embodiments may arise from the property of some space filling curves: the 2D distance between any pair of vertices is well-approximated by (the square root of) the distance along the curve. In this scenario, in some embodiments, the problem of finding an approximate 2D layout is equivalent to finding an energy-optimal linear ordering of vertices, which some embodiments may use to implement less computationally intensive heuristics, circumventing the initial combinatorial complexity. That said, not all embodiments provide this benefit, as the various inventions described herein are independently useful.

Figure 11:
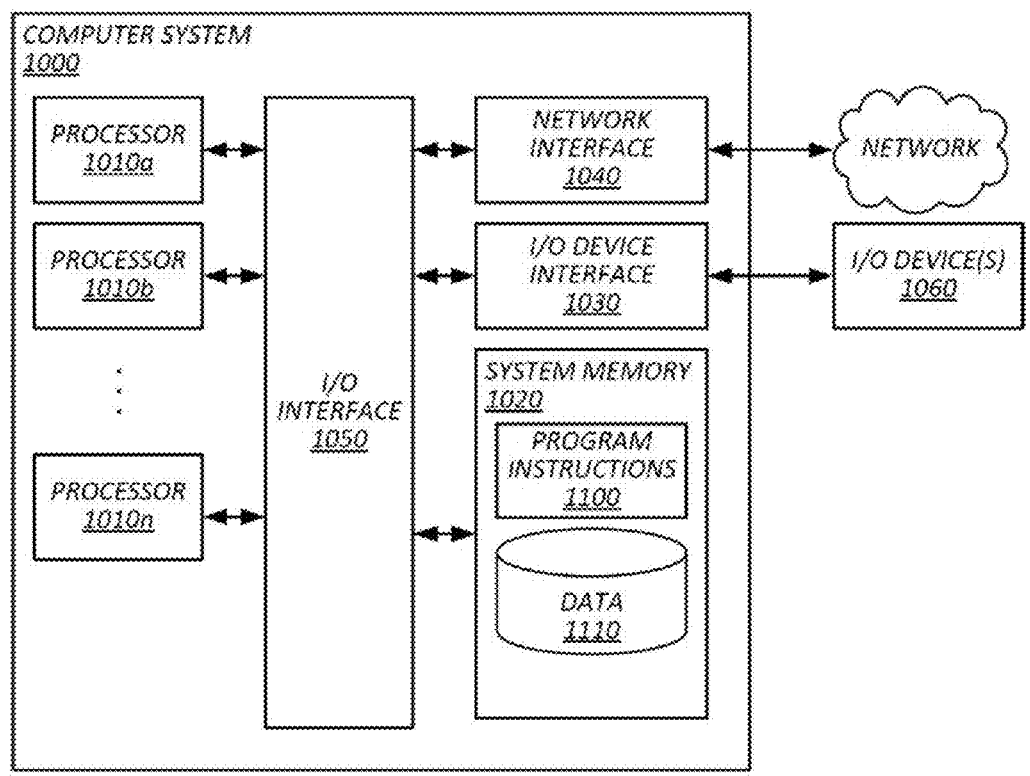
FIG. 11 illustrates an example of a computer system by which the above techniques may be implemented.

FIG. 11 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

The present techniques will be better understood with reference to the following enumerated embodiments:

1. A method of adjusting a visualization of a graph in response to user interactions with the visualization, the method comprising: obtaining a graph, the graph having a plurality of nodes and edges connecting the nodes; causing a visualization of the graph to be presented on one or more displays having a display area in which the visualization is presented; after causing the visualization of the graph to be presented, receiving a first user input requesting that a first lens be applied to the visualization, wherein: the first lens defines a first region of the display area that, at least initially, occupies a subset of the display area; the first lens specifies a first transformation that affects the visualization differently in the first region than outside the first region of the display area; selecting a first portion of the graph based on the first portion being presented within the first region in the visualization; transforming the first portion of the graph with the first transformation specified by the first lens; and causing the visualization of the graph to be updated to present in the display area both the transformed first portion and other portions of the graph outside the first region to which the first transformation is not applied.

2. The method of embodiment 1, comprising: providing a visualization of the graph in which multiple, touch-responsive lenses are overlaid on different, user-touch-adjustable portions of the graph, each of the lenses causing a different respective transformation to be applied to portions of the graph within regions of the display area specified by the respective lenses, wherein: the transformations including at least two of the following: changing a color of nodes based on respective values of a field of metadata associated with the respective nodes; changing weightings of scalars in node-specific vectors; changing a pruning threshold applied to an adjacency matrix indicating proximity of node-specific vectors in a vector space; changing parameters of a physics model by which a force-directed graph visualization is determined; changing a parameter of a clustering algorithm by which clusters of nodes are determined; at least some of the lenses are moveable and resizable responsive to user inputs applied to a touchscreen, at least some of the lenses are overlappable responsive to user inputs applied to the touchscreen, the overlap causing transformations specified by both overlapping lenses to be applied to portions of the graph in an area of overlap but not in areas of non-overlap; and at least some pairwise combinations of the lenses are not overlappable due to the respective pairwise combinations specifying incompatible transformations.

3. The method of any one of embodiments 1-2, comprising: receiving a touch event indicating a first touch position on a touchscreen of the one or more displays; receiving a touch-release event at a second touch position on the touchscreen; determining based on the first touch position that the first lens is selected by the user; determining based on the second touch position that the first lens is to be moved to a new location of the display area; determining a second region of the visualization corresponding to a movement of the first lens to the new location; selecting a second portion of the graph based on the second portion being within the second region in the visualization, the second portion having at least some nodes, edges, or clusters of the graph that are not in the first portion, and the first portion having at least some nodes, edges, or clusters of the graph that are not in the second portion; transforming the at least some nodes, edges, or clusters of the graph that are in the second portion but are not in the first portion with the transformation specified by the first lens; reverting the transformation of the at least some nodes, edges, or clusters of the graph that are in the first portion but are not in the second portion; and causing the visualization of the graph to be updated to present the transformed second portion and the reverted transformation of the at least some nodes, edges, or clusters of the graph that are in the first portion but are not in the second portion.

4. The method of any one of embodiments 1-3, comprising: receiving a multi-touch input specifying a starting distance between two touch locations and an ending distance between two other touch locations; determining a difference between the starting distance and the ending distance; based on the difference, changing a size of the first lens, wherein changing a size of the first lens comprises: changing a size of the first region; changing which parts of the graph are in the first portion and are transformed with the first transformation specified by the first lens; causing the visualization of the graph to be updated to present the changed transformation.

5. The method of any one of embodiments 1-4, wherein: the graph is a semantic similarity graph of a corpus of documents, the graph indicating semantic similarity of unstructured text in the documents; nodes of the graph represent documents in the corpus; edges of the graph indicate semantic similarity of documents represented by nodes to which the edges connect; semantic similarity is determined based on angles between feature vectors corresponding to the documents; the features vectors have scalars based on both frequency of occurrence n-grams in the respective documents and frequency of occurrence of the n-grams in a plurality of documents.

6. The method of embodiment 5, wherein the corpus has more than 5,000 documents and the graph has more than 5,000 nodes, wherein the first transformation and a plurality of other transformations corresponding to other candidate lenses among which the user selects are pre-calculated before receiving the first user input requesting that the first lens be applied.

7. The method of embodiment 5, wherein the first transformation applies one or more weights to a subset of the scalars.

8. The method of embodiment 7, wherein the subset of the scalars are selected by determining that n-grams corresponding to the respective scalars in the subset are associated with a topic identified by an un-supervised machine learning model.

9. The method of any one of embodiments 1-8, wherein the first transformation changes colors, sizes, shapes, or transparency of nodes, clusters, or edges in the visual representation based on values of fields associated with the respective nodes, clusters, or edges.

10. The method of any one of embodiments 1-9, wherein the first transformation is applied by a varying amount based on proximity to a perimeter of the first region, wherein applying the first transformation by a varying amount comprises: for a given node, edge, or cluster in the first portion, determining a distance from the given node, edge, or cluster to the perimeter; determining a scaling score based on the distance, the scaling score varying non-proportionally as a function of the distance; and decreasing an amount of first transformation for the given node, edge, or cluster based on the scaling score.

11. The method of any one of embodiments 1-10, wherein the first transformation comprises: changing a pruning threshold relative to a pruning threshold initially applied to an adjacency matrix to form the graph; adding or removing edges to the graph in the first portion based on whether values in the adjacency matrix satisfy the changed threshold.

12. The method of any one of embodiments 1-11, comprising: receiving an input sensed by a touchscreen, the input including both a location on the touchscreen and a value indicating an amount of force applied; and adjusting an amount of the first transformation or a size of the first region based on the amount of force applied.

13. The method of any one of embodiments 1-12, comprising: receiving a second user input requesting that a second lens be applied to the visualization, the second lens defining a second region of the display area different from the first area and specifying a second transformation different from the first transformation; receiving a third user input requesting translation or scaling of the first lens or the second lens; determining that the requested translation or scaling causes the first area and the second area to overlap in an overlap area, the overlap area being a subset of both the first area and the second area; selecting a second portion of the graph based on the second portion being within the overlap area in the visualization; and transforming the second portion of the graph with both the first transformation and the second transformation based on the selection of the second portion.

14. The method of any one of embodiments 1-13, comprising: receiving a second user request to scale or translate one of a plurality of lenses including the first lens; determining that the second user request would cause two of the plurality of lenses to overlap; determining that transformations of the two of the plurality of lenses are incompatible; and in response to the determination of incompatibility, performing a first part of the second user request that does not cause the two of the plurality of lenses to overlap and not performing a second part of the second user request that would cause the two of the plurality of lenses to overlap.

15. The method of any one of embodiments 1-14, comprising: receiving a second user input to adjust the first lens; modeling the adjustment with a physics model; and causing the adjustment to be animated based on the physics model.

16. The method of any one of embodiments 1-15, wherein the one or more displays comprise a head-mounted display and wherein a position of the visualization in the head-mounted display is determined based on an orientation of the head-mounted display, such that the graph appears to be static in space, at least some of the time, when the user re-orients the head-mounted display, and wherein the first user input is an audio input, a gaze-tracking input, or an input from a hand-held controller.

17. The method of any one of embodiments 1-16, wherein the first region is one of the following: a region lassoed by the user; a circle; or a slideable segment of the display area pulled in from an edge of the display area.

18. The method of any one of embodiments 1-17, wherein: obtaining a graph comprises steps for obtaining a similarity graph; and transforming the first portion comprises steps for transforming a portion of a graph selected with a lens.

19. The method of any one of embodiments 1-18, comprising: obtaining a corpus of documents; and forming the graph based on the corpus, wherein forming the graph and transforming the first portion are each performed by an on-premises application, a remotely hosted application relative to a client computing device upon which the visualization is displayed, or both.

20. A tangible, non-transitory, machine-readable medium storing instructions that when executed by a data processing apparatus cause the data processing apparatus to perform operations comprising: the operations of any of embodiments 1-19.

21. A system, comprising: one or more processors; an memory storing instructions that when executed by the processors cause the processors to effectuate operations comprising: the operations of any of embodiments 1-19.

What is claimed is:

1. A tangible, non-transitory, machine-readable medium storing instructions that when executed by one or more processors effectuate operations configured to adjust a visualization of a graph in response to user interactions with the visualization, the operations comprising:
   obtaining, with one or more processors, a graph, the graph having a plurality of nodes and edges connecting the nodes;
   causing, with one or more processors, a visualization of the graph to be presented on one or more displays having a display area in which the visualization is presented;
   after causing the visualization of the graph to be presented, receiving, with one or more processors, a first user input requesting that a first lens be applied to the visualization, wherein:
      the first lens defines a first region of the display area that, at least initially, occupies a subset of the display area;
      the first lens specifies a first transformation that affects the visualization differently in the first region than outside the first region of the display area;
   selecting, with one or more processors, a first portion of the graph based on the first portion being presented within the first region in the visualization;
   transforming, with one or more processors, the first portion of the graph with the first transformation specified by the first lens;
   causing, with one or more processors, the visualization of the graph to be updated to present in the display area both the transformed first portion and other portions of the graph outside the first region to which the first transformation is not applied;

receiving a multi-touch input specifying a starting distance between two touch locations and an ending distance between two other touch locations; and
determining a difference between the starting distance and the ending distance;
based on the difference, changing a size of the first lens, wherein changing a size of the first lens comprises:
changing a size of the first region;
changing which parts of the graph are in the first portion and are transformed with the first transformation specified by the first lens; and
causing the visualization of the graph to be updated to present the changed transformation.

2. The medium of claim 1, the operations comprising:
providing a visualization of the graph in which multiple, touch-responsive lenses are overlaid on different, user-touch-adjustable portions of the graph, each of the lenses causing a different respective transformation to be applied to portions of the graph within regions of the display area specified by the respective lenses, wherein:
the transformations including at least two of the following:
changing a color of nodes based on respective values of a field of metadata associated with the respective nodes;
changing weightings of scalars in node-specific vectors;
changing a pruning threshold applied to an adjacency matrix indicating proximity of node-specific vectors in a vector space;
changing parameters of a physics model by which a force-directed graph visualization is determined; or
changing a parameter of a clustering algorithm by which clusters of nodes are determined;
at least some of the lenses are moveable and resizable responsive to user inputs applied to a touchscreen,
at least some of the lenses are overlappable responsive to user inputs applied to the touchscreen, the overlap causing transformations specified by both overlapping lenses to be applied to portions of the graph in an area of overlap but not in areas of non-overlap; and
at least some pairwise combinations of the lenses are not overlappable due to the respective pairwise combinations specifying incompatible transformations.

3. The medium of claim 1, the operations comprising:
receiving a touch event indicating a first touch position on a touchscreen of the one or more displays;
receiving a touch-release event at a second touch position on the touchscreen;
determining based on the first touch position that the first lens is selected by the user;
determining based on the second touch position that the first lens is to be moved to a new location of the display area;
determining a second region of the visualization corresponding to a movement of the first lens to the new location;
selecting a second portion of the graph based on the second portion being within the second region in the visualization, the second portion having at least some nodes, edges, or clusters of the graph that are not in the first portion, and the first portion having at least some nodes, edges, or clusters of the graph that are not in the second portion;
transforming the at least some nodes, edges, or clusters of the graph that are in the second portion but are not in the first portion with the transformation specified by the first lens;
reverting the transformation of the at least some nodes, edges, or clusters of the graph that are in the first portion but are not in the second portion; and
causing the visualization of the graph to be updated to present the transformed second portion and the reverted transformation of the at least some nodes, edges, or clusters of the graph that are in the first portion but are not in the second portion.

4. The medium of claim 1, wherein:
the graph is a semantic similarity graph of a corpus of documents, the graph indicating semantic similarity of unstructured text in the documents;
nodes of the graph represent documents in the corpus;
edges of the graph indicate semantic similarity of documents represented by nodes to which the edges connect;
semantic similarity is determined based on angles between feature vectors corresponding to the documents; and
the features vectors have scalars based on both frequency of occurrence n-grams in the respective documents and frequency of occurrence of the n-grams in a plurality of documents.

5. The medium of claim 4, wherein the corpus has more than 5,000 documents and the graph has more than 5,000 nodes, wherein the first transformation and a plurality of other transformations corresponding to other candidate lenses among which the user selects are pre-calculated before receiving the first user input requesting that the first lens be applied.

6. The medium of claim 4, wherein the first transformation applies one or more weights to a subset of the scalars.

7. The medium of claim 6, wherein the subset of the scalars are selected by determining that n-grams corresponding to the respective scalars in the subset are associated with a topic identified by an un-supervised machine learning model.

8. The medium of claim 1, wherein the first transformation changes colors, sizes, shapes, or transparency of nodes, clusters, or edges in the visual representation based on values of fields associated with the respective nodes, clusters, or edges.

9. The medium of claim 1, wherein the first transformation is applied by a varying amount based on proximity to a perimeter of the first region, wherein applying the first transformation by a varying amount comprises:
for a given node, edge, or cluster in the first portion, determining a distance from the given node, edge, or cluster to the perimeter;
determining a scaling score based on the distance, the scaling score varying non-proportionally as a function of the distance; and
decreasing an amount of first transformation for the given node, edge, or cluster based on the scaling score.

10. The medium of claim 1, wherein the first transformation comprises:
changing a pruning threshold relative to a pruning threshold initially applied to an adjacency matrix to form the graph; and
adding or removing edges to the graph in the first portion based on whether values in the adjacency matrix satisfy the changed threshold.

11. The medium of claim 1, the operations comprising:
receiving an input sensed by a touchscreen, the input including both a location on the touchscreen and a value indicating an amount of force applied; and
adjusting an amount of the first transformation or a size of the first region based on the amount of force applied.

12. The medium of claim 1, the operations comprising:
receiving a second user input requesting that a second lens be applied to the visualization, the second lens defining a second region of the display area different from the first area and specifying a second transformation different from the first transformation;
receiving a third user input requesting translation or scaling of the first lens or the second lens;
determining that the requested translation or scaling causes the first area and the second area to overlap in an overlap area, the overlap area being a subset of both the first area and the second area;
selecting a second portion of the graph based on the second portion being within the overlap area in the visualization; and
transforming the second portion of the graph with both the first transformation and the second transformation based on the selection of the second portion.

13. The medium of claim 1, the operations comprising:
receiving a second user request to scale or translate one of a plurality of lenses including the first lens;
determining that the second user request would cause two of the plurality of lenses to overlap;
determining that transformations of the two of the plurality of lenses are incompatible; and
in response to the determination of incompatibility, performing a first part of the second user request that does not cause the two of the plurality of lenses to overlap and not performing a second part of the second user request that would cause the two of the plurality of lenses to overlap.

14. The medium of claim 1, the operations comprising:
receiving a second user input to adjust the first lens;
modeling the adjustment with a physics model; and
causing the adjustment to be animated based on the physics model.

15. The medium of claim 1, wherein the one or more displays comprise a head-mounted display and wherein a position of the visualization in the head-mounted display is determined based on an orientation of the head-mounted display, such that the graph appears to be static in space, at least some of the time, when the user re-orients the head-mounted display, and wherein the first user input is an audio input, a gaze-tracking input, or an input from a hand-held controller.

16. The medium of claim 1, wherein the first region is one of the following:
a region lassoed by the user;
a circle; or
a slideable segment of the display area pulled in from an edge of the display area.

17. The medium of claim 1, wherein:
obtaining a graph comprises steps for obtaining a similarity graph; and
transforming the first portion comprises steps for transforming a portion of a graph selected with a lens.

18. The medium of claim 1, the operations comprising:
obtaining a corpus of documents; and
forming the graph based on the corpus, wherein forming the graph and transforming the first portion are each performed by an on-premises application, a remotely hosted application relative to a client computing device upon which the visualization is displayed, or both.

19. A tangible, non-transitory, machine-readable medium storing instructions that when executed by one or more processors effectuate configured to adjust a visualization of a graph in response to user interactions with the visualization, the operations comprising:
obtaining, with one or more processors, a graph, the graph having a plurality of nodes and edges connecting the nodes;
causing, with one or more processors, a visualization of the graph to be presented on one or more displays having a display area in which the visualization is presented;
after causing the visualization of the graph to be presented, receiving, with one or more processors, a first user input requesting that a first lens be applied to the visualization, wherein:
the first lens defines a first region of the display area that, at least initially, occupies a subset of the display area;
the first lens specifies a first transformation that affects the visualization differently in the first region than outside the first region of the display area;
selecting, with one or more processors, a first portion of the graph based on the first portion being presented within the first region in the visualization;
transforming, with one or more processors, the first portion of the graph with the first transformation specified by the first lens; and
causing, with one or more processors, the visualization of the graph to be updated to present in the display area both the transformed first portion and other portions of the graph outside the first region to which the first transformation is not applied, wherein:
the graph is a semantic similarity graph of a corpus of documents, the graph indicating semantic similarity of unstructured text in the documents;
nodes of the graph represent documents in the corpus;
edges of the graph indicate semantic similarity of documents represented by nodes to which the edges connect;
semantic similarity is determined based on angles between feature vectors corresponding to the documents; and
the features vectors have scalars based on both frequency of occurrence n-grams in the respective documents and frequency of occurrence of the n-grams in a plurality of documents.

20. The medium of claim 19, the operations comprising:
receiving a touch event indicating a first touch position on a touchscreen of the one or more displays;
receiving a touch-release event at a second touch position on the touchscreen;
determining based on the first touch position that the first lens is selected by the user;
determining based on the second touch position that the first lens is to be moved to a new location of the display area;
determining a second region of the visualization corresponding to a movement of the first lens to the new location;
selecting a second portion of the graph based on the second portion being within the second region in the visualization, the second portion having at least some nodes, edges, or clusters of the graph that are not in the first portion, and the first portion having at least some nodes, edges, or clusters of the graph that are not in the second portion;

transforming the at least some nodes, edges, or clusters of the graph that are in the second portion but are not in the first portion with the transformation specified by the first lens;

reverting the transformation of the at least some nodes, edges, or clusters of the graph that are in the first portion but are not in the second portion; and causing the visualization of the graph to be updated to present the transformed second portion and the reverted transformation of the at least some nodes, edges, or clusters of the graph that are in the first portion but are not in the second portion.

21. The medium of claim 19, wherein the first transformation applies one or more weights to a subset of the scalars, and wherein the subset of the scalars are selected by determining that n-grams corresponding to the respective scalars in the subset are associated with a topic identified by an un-supervised machine learning model.

22. The medium of claim 19, the operations comprising:
receiving a second user request to scale or translate one of a plurality of lenses including the first lens;
determining that the second user request would cause two of the plurality of lenses to overlap;
determining that transformations of the two of the plurality of lenses are incompatible; and
in response to the determination of incompatibility, performing a first part of the second user request that does not cause the two of the plurality of lenses to overlap and not performing a second part of the second user request that would cause the two of the plurality of lenses to overlap.

23. A tangible, non-transitory, machine-readable medium storing instructions that when executed by one or more processors effectuate configured to adjust a visualization of a graph in response to user interactions with the visualization, the operations comprising:
obtaining, with one or more processors, a graph, the graph having a plurality of nodes and edges connecting the nodes;
causing, with one or more processors, a visualization of the graph to be presented on one or more displays having a display area in which the visualization is presented;
after causing the visualization of the graph to be presented, receiving, with one or more processors, a first user input requesting that a first lens be applied to the visualization, wherein:
the first lens defines a first region of the display area that, at least initially, occupies a subset of the display area;
the first lens specifies a first transformation that affects the visualization differently in the first region than outside the first region of the display area;
selecting, with one or more processors, a first portion of the graph based on the first portion being presented within the first region in the visualization;
transforming, with one or more processors, the first portion of the graph with the first transformation specified by the first lens; and
causing, with one or more processors, the visualization of the graph to be updated to present in the display area both the transformed first portion and other portions of the graph outside the first region to which the first transformation is not applied, wherein the first transformation is applied by a varying amount based on proximity to a perimeter of the first region,
wherein applying the first transformation by a varying amount comprises:
for a given node, edge, or cluster in the first portion, determining a distance from the given node, edge, or cluster to the perimeter;
determining a scaling score based on the distance, the scaling score varying non-proportionally as a function of the distance; and
decreasing an amount of first transformation for the given node, edge, or cluster based on the scaling score.

24. The medium of claim 23, wherein:
the graph is a semantic similarity graph of a corpus of documents, the graph indicating semantic similarity of unstructured text in the documents;
nodes of the graph represent documents in the corpus;
edges of the graph indicate semantic similarity of documents represented by nodes to which the edges connect;
semantic similarity is determined based on angles between feature vectors corresponding to the documents; and
the features vectors have scalars based on both frequency of occurrence n-grams in the respective documents and frequency of occurrence of the n-grams in a plurality of documents.

25. The medium of claim 23, the operations comprising:
receiving a second user input requesting that a second lens be applied to the visualization, the second lens defining a second region of the display area different from the first area and specifying a second transformation different from the first transformation;
receiving a third user input requesting translation or scaling of the first lens or the second lens;
determining that the requested translation or scaling causes the first area and the second area to overlap in an overlap area, the overlap area being a subset of both the first area and the second area;
selecting a second portion of the graph based on the second portion being within the overlap area in the visualization; and
transforming the second portion of the graph with both the first transformation and the second transformation based on the selection of the second portion.

26. A tangible, non-transitory, machine-readable medium storing instructions that when executed by one or more processors effectuate configured to adjust a visualization of a graph in response to user interactions with the visualization, the operations comprising:
obtaining, with one or more processors, a graph, the graph having a plurality of nodes and edges connecting the nodes;
causing, with one or more processors, a visualization of the graph to be presented on one or more displays having a display area in which the visualization is presented;
after causing the visualization of the graph to be presented, receiving, with one or more processors, a first user input requesting that a first lens be applied to the visualization, wherein:
the first lens defines a first region of the display area that, at least initially, occupies a subset of the display area;

the first lens specifies a first transformation that affects the visualization differently in the first region than outside the first region of the display area;

selecting, with one or more processors, a first portion of the graph based on the first portion being presented within the first region in the visualization;

transforming, with one or more processors, the first portion of the graph with the first transformation specified by the first lens; and causing, with one or more processors, the visualization of the graph to be updated to present in the display area both the transformed first portion and other portions of the graph outside the first region to which the first transformation is not applied, wherein the first transformation comprises:
   changing a pruning threshold relative to a pruning threshold initially applied to an adjacency matrix to form the graph; and
   adding or removing edges to the graph in the first portion based on whether values in the adjacency matrix satisfy the changed threshold.

27. The medium of claim 26, wherein:

the graph is a semantic similarity graph of a corpus of documents, the graph indicating semantic similarity of unstructured text in the documents;

nodes of the graph represent documents in the corpus;

edges of the graph indicate semantic similarity of documents represented by nodes to which the edges connect;

semantic similarity is determined based on angles between feature vectors corresponding to the documents;

the features vectors have scalars based on both frequency of occurrence n-grams in the respective documents and frequency of occurrence of the n-grams in a plurality of documents; and the corpus has more than 5,000 documents and the graph has more than 5,000 nodes, wherein the first transformation and a plurality of other transformations corresponding to other candidate lenses among which the user selects are pre-calculated before receiving the first user input requesting that the first lens be applied.

28. The medium of claim 26, the operations comprising:

receiving a second user request to scale or translate one of a plurality of lenses including the first lens;

determining that the second user request would cause two of the plurality of lenses to overlap;

determining that transformations of the two of the plurality of lenses are incompatible; and in response to the determination of incompatibility, performing a first part of the second user request that does not cause the two of the plurality of lenses to overlap and not performing a second part of the second user request that would cause the two of the plurality of lenses to overlap.

\* \* \* \* \*